United States Patent
Lee et al.

(10) Patent No.: US 8,645,999 B2
(45) Date of Patent: Feb. 4, 2014

(54) METHOD OF PROCESSING EPG METADATA IN NETWORK DEVICE AND THE NETWORK DEVICE FOR CONTROLLING THE SAME

(75) Inventors: Joon Hui Lee, Seoul (KR); Gomer Thomas, Arlington, WA (US); So Young Kim, Seoul (KR); Joo Hwan Sul, Seoul (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 12/906,696

(22) Filed: Oct. 18, 2010

(65) Prior Publication Data

US 2011/0258666 A1    Oct. 20, 2011

Related U.S. Application Data

(60) Provisional application No. 61/302,539, filed on Feb. 8, 2010.

(51) Int. Cl.
- *H04N 5/445* (2011.01)
- *G06F 3/00* (2006.01)
- *G06F 13/00* (2006.01)

(52) U.S. Cl.
USPC ................................ 725/39; 725/38; 725/54

(58) Field of Classification Search
None
See application file for complete search history.

(56) References Cited

U.S. PATENT DOCUMENTS

| | | | |
|---|---|---|---|
| 6,904,609 B1* | 6/2005 | Pietraszak et al. | 725/39 |
| 2007/0055786 A1* | 3/2007 | Pohjolainen et al. | 709/230 |
| 2009/0158330 A1* | 6/2009 | Song et al. | 725/39 |

FOREIGN PATENT DOCUMENTS

| | | |
|---|---|---|
| JP | 2009-059160 | 3/2009 |
| KR | 10-2008-0048763 A | 6/2008 |
| KR | 10-2008-0063714 A | 7/2008 |

* cited by examiner

*Primary Examiner* — Jason J Chung
*Assistant Examiner* — James R Marandi
(74) *Attorney, Agent, or Firm* — McKenna Long & Aldridge LLP

(57) ABSTRACT

A method of processing EPG metadata in a network according to one embodiment of the present invention includes the steps of performing a services discovery procedure utilizing multiple service discovery metadata components supplied by a service provider and processing an EPG metadata. Moreover, the performing step includes the steps of receiving a master SI table which locates in a master SI table location in provisioning information, wherein the provisioning information includes multiple elements, an EPG provider information element in the multiple elements having both a delivery layer element and an EPG data locator element, the delivery layer element giving a type of delivery layer that is delivered by at least one of an EPG metadata provider's multicast EPG data sources, receiving a virtual channel map table which locates in virtual channel map locations in the received master SI table, receiving a virtual channel description table which locates in virtual channel description table locations in the received virtual channel map table, and receiving a source table which locates in source table locations in the received virtual channel description table.

16 Claims, 40 Drawing Sheets

FIG. 10

```
<complexType name="ProgramInformationType">
    <sequence>
        <element name="BasicDescription"
        type = "epg:BasicContentDescriptionType"/>
        <element name="OtherIdentifier"
        type = "mpeg7:UniqueIDType"
        minOccurs = "0"
        maxOccurs = "unbounded"/>
        <element name="AVAttributes"
        type = "epg:AVAttributesType"
        minOccurs = "0"/>
        <element name="MemberOf"
        type = "tva:BaseMemberOfType"
        minOccurs = "0"
        maxOccurs = "unbounded"/>
        <element name="DerivedFrom"
        type = "tva:DerivedFromType"
        minOccurs = "0"/>
        <element name="EpisodeOf"
        type = "tva:EpisodeOfType"
        minOccurs = "0"/>
        <element name="PartOfAggregatedProgram"
        type = "tva:CRIDType"
        minOccurs = "0"/>
        <element name="AggregationOf"
        type = "tva:AggregationOfType"
        minOccurs = "0"/>
    </sequence>
    <attribute name="programId"
        type = "tva:CRIDType"
        use = "required"/>
    <attribute name="metadataOriginIDRef"
        type = "tva:TVAIDRefType"
        use = "optional"/>
    <attribute ref = "xml:lang" use = "optional"/>
</complexType>
```

FIG. 12

```xml
<complexType name="BasicContentDescriptionType">
  <sequence>
    <element name="Title" type="mpeg7:TitleType" minOccurs="0" maxOccurs="unbounded"/>
    <element name="MediaTitle" type="mpeg7:TitleMediaType" minOccurs="0" maxOccurs="unbounded"/>
    <element name="ShortTitle" type="tva:ShortTitleType" minOccurs="0" maxOccurs="unbounded"/>
    <element name="Synopsis" type="tva:SynopsisType" minOccurs="0" maxOccurs="unbounded"/>
    <element name="PromotionalInformation" type="mpeg7:TextualType" minOccurs="0" maxOccurs="unbounded"/>
    <element name="ProgramURL" type="aniURI" minOccurs="0" maxOccurs="unbounded"/>
    <element name="ProgramInfoURL" type="aniURI" minOccurs="0" maxOccurs="unbounded"/>
    <element name="Keyword" type="tva:KeywordType" minOccurs="0" maxOccurs="unbounded"/>
    <element name="Genre" type="tva:GenreType" minOccurs="0" maxOccurs="unbounded"/>
    <element name="RRTParentalGuidance" type="epg:RRTParentalGuidanceType" minOccurs="0" maxOccurs="unbounded"/>
    <element name="ParentalGuidance" type="mpeg7:ParentalGuidanceType" minOccurs="0" maxOccurs="unbounded"/>
    <element name="Language" type="mpeg7:ExtendedLanguageType" minOccurs="0" maxOccurs="unbounded"/>
    <element name="CaptionLanguage" type="tva:CaptionLanguageType" minOccurs="0" maxOccurs="unbounded"/>
    <element name="SignLanguage" type="tva:SignLanguageType" minOccurs="0" maxOccurs="unbounded"/>
    <element name="CreditsList" type="epg:CreditsListType" minOccurs="0"/>
    <element name="AwardsList" type="epg:AwardsListType" minOccurs="0"/>
    <element name="BoxOffice" type="tva:PriceType" minOccurs="0" maxOccurs="unbounded"/>
    <element name="RelatedMaterial" type="tva:RelatedMaterial" minOccurs="0" maxOccurs="unbounded"/>
    <element name="ProductionDate" type="tva:TVATimeType" minOccurs="0"/>
    <element name="ProductionLocation" type="mpeg7:regionCode" minOccurs="0" maxOccurs="unbounded"/>
    <element name="CreationCoordinates" type="tva:CreationCoordinatesType" minOccurs="0" maxOccurs="unbounded"/>
    <element name="DepictedCoordinates" type="tva:DepictedCoordinatesType" minOccurs="0" maxOccurs="unbounded"/>
    <element name="ReleaseInformation" type="tva:ReleaseInformationType" minOccurs="0" maxOccurs="unbounded"/>
    <element name="Duration" type="Duration" minOccurs="0"/>
    <element name="PurchaseList" type="epg:PurchaseListType" minOccurs="0"/>
  </sequence>
  <attribute name="programFormat" use="optional">
    <simpleType>
      <restriction base="string">
        <enumeration value="Series"/>
        <enumeration value="Movie"/>
        <enumeration value="Paid program"/>
        <enumeration value="Special"/>
      </restriction>
    </simpleType>
  </attribute name>
  <attribute name="copyRestrictions" type="epg:CopyControlInformationType" use="optional"/>
</complexType>
```

FIG. 15

```
<complexType name="CODCatalogServerInfoType">
  <sequence>
    <element name="CODCatalogServerLocator" type="cddc:EPGDataLocatorType"/>
    <element name="TargetServiceProviderID" type="gt:IIFIDType" minOccurs="0"/>
    <element name="NumberOfDeliveryLayer" type="unsignedInt" minOccurs="0"/>
  </sequence>
</complexType>
<complexType name="CODServiceInfoType">
  <sequence>
    <element name="CODCatalogServerInfo" type="cddc:CODCatalogServerInfoType" minOccurs="0" maxOccurs="unbounded"/>
    <element name="ThinClientPortal" type="anyURI" minOccurs="0"/>
    <element name="CODApplicationServer" type="anyURI" minOccurs="0" maxOccurs="unbounded"/>
    <element name="ITFMaxiumumCODBandwidth" type="positiveInteger" minOccurs="0"/>
    <element name="ITFMiniumumCODStorageSpace" type="positiveInteger" minOccurs="0"/>
  </sequence>
</complexType>
```

FIG. 18

```
<complexType name="EPGProviderInfoType">
  <sequence>
    <element name="EPGProviderName" type="mpeg7:TextualType" maxOccurs="unbounded"/>
    <element name="EPGProviderDescription" type="mpeg7:TextualType" minOccurs="0" maxOccurs="unbounded"/>
    <element name="EPGDataLocator" type="cddc:EPGDataLocatorType"/>
    <element name="TargetServiceProviderID" type="gt:IIFIDType" minOccurs="0"/>
    <element name="EPGProviderLogo" type="mps:ResourceLocatorType" minOccurs="0"/>
    <element name="SupportedServiceType" type="cddc:TypeOfSupportedServiceType" minOccurs="0" maxOccurs="unbounded"/>
    <element name="NumberOfDeliveryLayer" type="unsignedInt" minOccurs="0"/>
  </sequence>
  <attribute name="epgProviderID" type="gt:IIFIDType" use="optional"/>
  <attribute name="version" type="unsignedInt"/>
</complexType>
```

FIG. 19

```
<complexType name="EPGProviderInfoType"/>
 <sequence>
  <element name="EPGProviderName" type="mpeg7:TextualType" maxOccurs="unbounded"/>
  <element name="EPGProviderDescription" type="mpeg7:TextualType" minOccurs="0" maxOccurs="unbounded"/>
  <element name="EPGDataLocator" type="cddc:EPGDataLocatorType"/>
  <element name="TargetServiceProviderID" type="gt:IIFIDType" minOccurs="0"/>
  <element name="EPGProviderLogo" type="mps:ResourceLocatorType" minOccurs="0"/>
  <element name="SupportedServiceType" type="cddc:TypeOfSupportedServiceType" minOccurs="0"
 maxOccurs="unbounded"/>
  <element name="DeliveryLayer" type="TypeOfDeliveryLayer"
 minOccurs="0" maxOccurs="unbounded"/>
 </sequence>
 <attribute name="epgProviderID" type="gt:IIFIDType" use="optional"/>
 <attribute name="version" type="unsignedInt"/>
</complexType>
```

FIG. 21

```
<complexType name="EPGDataLocatorType">
  <choice maxOccurs="unbounded">
    <element name="MulticastEPGService">
      <complexType>
        <complexContent>
          <extension base="mps:FluteSessionLocatorType">
            <attribute name="SupportedServiceType" type="cddc:TypeOfSupportedServiceType"/>
            <attribute name="DeliveryLayer" type="cddc:TypeOfDeliveryLayer"/>
          </extension>
        </complexContent>
      </complexType>
    </element>
    <element name="UnicastEPGService">
      <complexType>
        <simpleContent>
          <extension base="anyURI">
            <attribute name="SupportedServiceType" type="cddc:TypeOfSupportedServiceType"/>
            <attribute name="DeliveryLayer" type="cddc:TypeOfDeliveryLayer"/>
          </extension>
        </simpleContent>
      </complexType>
    </element>
  </choice>
</complexType>
```

FIG. 22

```
<simpleType name="TypeOfDeliveryLayer">
    <restriction base="string">
        <enumeration value="List"/>
        <enumeration value="Lite"/>
        <enumeration value="Full"/>
    </restriction>
</simpleType>
```

FIG. 24

```
<complexType name="EPGProviderInfoType">
  <sequence>
    <element name="EPGProviderName" type="mpeg7:TextualType" maxOccurs="unbounded"/>
    <element name="EPGProviderDescription" type="mpeg7:TextualType" minOccurs="0" maxOccurs="unbounded"/>
    <element name="EPGDataLocator" type="cddc:EPGDataLocatorType"/>
    <element name="TargetServiceProviderID" type="gt:IIFIDType" minOccurs="0"/>
    <element name="EPGProviderLogo" type="mps:ResourceLocatorType" minOccurs="0"/>
    <element name="SupportedServiceType" type="cddc:TypeOfSupportedServiceType" minOccurs="0" maxOccurs="unbounded"/>
    <element name="NumberOfDeliveryLayer" type="unsignedInt" minOccurs="0"/>
    <element name="TargetServiceID" type="gt:IIFIDType" minOccurs="0" maxOccurs="unbounded"/>
  </sequence>
  <attribute name="epgProviderID" type="gt:IIFIDType" use="optional"/>
  <attribute name="version" type="unsignedInt"/>
</complexType>
```

FIG. 26

```
<complexType name="EPGDataLocatorType">
  <choice maxOccurs="unbounded">
    <element name="MulticastEPGService">
      <complexType>
        <complexContent>
          <extension base="mps:FluteSessionLocatorType">
            <sequence>
              <element name="SupportedServiceType" type="cddc:TypeOfSupportedServiceType" minOccurs="0" maxOccurs="unbounded"/>
              <element name="TargetServiceID" type="gt:IIFIDType" minOccurs="0" maxOccurs="unbounded"/>
            </sequence>
            <attribute name="DeliveryLayer" type="cddc:TypeOfDeliveryLayer"/>
          </extension>
        </complexContent>
      </complexType>
    </element>
    <element name="UnicastEPGService" type="cddc:UnicastEPGServiceType"/>
  </choice>
</complexType>
<complexType name="UnicastEPGServiceType">
  <sequence>
    <element name="UnicastEPGServiceLocation" type="anyURI"/>
    <element name="SupportedServiceType" type="cddc:TypeOfSupportedServiceType" minOccurs="0" maxOccurs="unbounded"/>
    <element name="TargetServiceID" type="gt:IIFIDType" minOccurs="0" maxOccurs="unbounded"/>
  </sequence>
  <attribute name="DeliveryLayer" type="cddc:TypeOfDeliveryLayer"/>
</complexType>
```

FIG. 30

```xml
<complexType name="EPGProviderInfoType">
  <sequence>
    <element name="EPGProviderName" type="mpeg7:TextualType" maxOccurs="unbounded"/>
    <element name="EPGProviderDescription" type="mpeg7:TextualType" minOccurs="0" maxOccurs="unbounded"/>
    <element name="EPGDataLocator" type="cddc:EPGDataLocatorType"/>
    <element name="TargetServiceProviderID" type="gt:IIFIDType" minOccurs="0"/>
    <element name="EPGProviderLogo" type="mps:ResourceLocatorType" minOccurs="0"/>
    <element name="SupportedServiceType" type="cddc:TypeOfSupportedServiceType" minOccurs="0" maxOccurs="unbounded"/>
    <element name="NumberOfDeliveryLayer" type="unsignedInt" minOccurs="0"/>
    <element name="TargetServiceID" type="gt:IIFIDType" minOccurs="0" maxOccurs="unbounded"/>
    <element name="TargetVirtualChannelMapID" type="gt:IIFIDType" minOccurs="0" maxOccurs="unbounded"/>
  </sequence>
  <attribute name="epgProviderID" type="gt:IIFIDType" use="optional"/>
  <attribute name="version" type="unsignedInt"/>
</complexType>
```

FIG. 32

```
<complexType name="XUnicastEPGServiceType">
  <sequence>
    <element name="UnicastEPGServiceLocation" type="anyURI"/>
    <element name="SupportedServiceType" type="cddc:TypeOfSupportedServiceType" minOccurs="0" maxOccurs="unbounded"/>
    <element name="TargetServiceID" type="gt:IIFIDType" minOccurs="0" maxOccurs="unbounded"/>
    <element name="TargetVirtualChannelMapID" type="gt:IIFIDType" minOccurs="0" maxOccurs="unbounded"/>
  </sequence>
</complexType>
<complexType name="XMulticastEPGServiceType">
  <complexContent>
    <extension base="mps:FluteSessionLocatorType">
      <sequence>
        <element name="SupportedServiceType" type="cddc:TypeOfSupportedServiceType" minOccurs="0" maxOccurs="unbounded"/>
        <element name="TargetServiceID" type="gt:IIFIDType" minOccurs="0" maxOccurs="unbounded"/>
        <element name="TargetVirtualChannelMapID" type="gt:IIFIDType" minOccurs="0" maxOccurs="unbounded"/>
      </sequence>
    </extension>
  </complexContent>
</complexType>
<complexType name="EPGDataLocatorType">
  <choice maxOccurs="unbounded">
    <element name="MulticastEPGService" type="cddc:XMulticastEPGServiceType"/>
    <element name="UnicastEPGService" type="anyURI"/>
    <element name="XUnicastEPGService" type="cddc:XUnicastEPGServiceType"/>
  </choice>
</complexType>
```

FIG. 33

| 0x80 | IIFMain fragment, all profiles |
|---|---|
| 0x81 | MetadataOriginationInformation fragment |
| 0x82 | ClassificationScheme fragment |
| 0x83 | CSAlias fragment |
| 0x84 | RatingRegionTable fragment |
| 0x85 | ProgramInformation fragment |
| 0x86 | GroupInformation fragment |
| 0x87 | SuperGroupInformation fragment |
| 0x88 | Schedule fragment |
| 0x89 | BroadcastEvent fragment |
| 0x8A | OnDemandProgram fragment |
| 0x8B | OnDemandService fragment |
| 0x8C | PersonName fragment |
| 0x8D | OrganizationName fragment |
| 0x8E | Review fragment |
| 0x8F | PurchaseInformation fragment |

FIG. 35

```
<xs:complexType name="GroupingCriteriaType">
  <xs:sequence>
    <xs:element name="TimeGroupingCriteria" type="TimeGroupingCriteriaType" minOccurs="0"/>
    <xs:element name="GenreGroupingCriteria" type="GenreType" minOccurs="0"/>
    <xs:element name="BSMSelector" type="BSMSelectorIDRefType" minOccurs="0" maxOccurs="unbounded"/>
    <xs:element name="ServiceCriteria" type="xs:anyURI" minOccurs="0"/>
    <xs:element name="VirtualChannelMapCriteria" type="gt:IIFIDType" minOccurs="0"/>
  </xs:sequence>
</xs:complexType>
```

METHOD OF PROCESSING EPG METADATA IN NETWORK DEVICE AND THE NETWORK DEVICE FOR CONTROLLING THE SAME

This application claims the benefit of U.S. Provisional Application No. 61/302,539, filed on Feb. 8, 2010, which are hereby incorporated by reference as if fully set forth herein.

BACKGROUND OF THE INVENTION

1. Field of the Invention

The present invention relates to EPG metadata, and more particularly, to an IPTV and method of processing EPG metadata therein.

2. Discussion of the Related Art

In a conventional TV system, a content produced by a broadcasting service provider is transmitted via such a radio wave transfer medium as terrestrial, cable, satellite and the like and a viewer is able to view the content via a TV receiver capable of receiving the transfer medium. As the digital TV technology is developed and commercialized from the conventional analog broadcasting, a viewer can be provided with various contents including real-time broadcasts, CoD (contents on demand), games, news and the like using Internet connected to each home as well as the conventional radio wave media. For example, the contents via internet can be provided via IPTV (internet protocol TV).

However, the related art fails to provide a method for a network device (e.g., an IPTV, etc.) to search and process EPG (electronic program guide) metadata quickly and efficiently.

SUMMARY OF THE INVENTION

Accordingly, the present invention is directed to a method of processing EPG metadata in a network device and the network device for controlling the same that substantially obviate one or more problems due to limitations and disadvantages of the related art.

An object of the present invention is to provide protocol, by which a network device (e.g., an IPTV, etc.) is enabled to process an EPG service related to contents of a real-time TV service (or a linear TV service) or a COD (contents on demand) service more quickly.

Another object of the present invention is to provide method of processing EPG metadata, by which EPG metadata of various types ongoing to rise can be more efficiently processed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing EPG metadata in a network according to one embodiment of the present invention includes the steps of performing a services discovery procedure utilizing multiple service discovery metadata components supplied by a service provider and processing an EPG metadata. Moreover, the performing step includes the steps of receiving a master SI table which locates in a master SI table location in provisioning information, wherein the provisioning information includes multiple elements, an EPG provider information element in the multiple elements having both a delivery layer element and an EPG data locator element, the delivery layer element giving a type of delivery layer that is delivered by at least one of an EPG metadata provider's multicast EPG data sources, receiving a virtual channel map table which locates in virtual channel map locations in the received master SI table, receiving a virtual channel description table which locates in virtual channel description table locations in the received virtual channel map table, and receiving a source table which locates in source table locations in the received virtual channel description table.

Accordingly, the present invention provides the following effects and/or advantages.

First of all, according to one embodiment of the present invention, a network device (e.g., an IPTV, etc.) is able to process an EPG service related to contents of a real-time TV service (or a linear TV service) or a COD (contents on demand) service more quickly.

Secondly, according to another embodiment of the present invention, EPG metadata of various types ongoing to rise can be more efficiently processed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 and FIG. 10 are diagrams for a data structure of program information according to one embodiment of the present invention, respectively;

FIG. 11 and FIG. 12 are diagrams for a data structure of basic content description according to one embodiment of the present invention, respectively;

FIGS. 13 to 15 are diagrams for a data structure of provisioning information according to one embodiment of the present invention;

FIGS. 17 to 19 are diagrams for a data structure of EPG provider information according to one embodiment of the present invention, respectively;

FIG. 20 and FIG. 21 are diagrams for a data structure of an EPG data locator according to one embodiment of the present invention, respectively;

FIG. 22 is a diagram for a data structure of a delivery layer according to one embodiment of the present invention;

FIG. 23 and FIG. 24 are diagrams for a data structure of EPG provider information according to another embodiment of the present invention, respectively;

FIG. 25 and FIG. 26 are diagrams for a data structure of an EPG data locator according to another embodiment of the present invention, respectively;

FIG. 29 and FIG. 30 are diagrams for a data structure of a virtual channel map for signaling an EPG service provider per EPG virtual channel map according to one embodiment of the present invention, respectively;

FIG. 31 and FIG. 32 are diagrams for a data structure of an EPG data locator for signaling an EPG service provider per EPG virtual channel map according to one embodiment of the present invention, respectively;

FIG. 33 is a table of fragments according to another embodiment of the present invention;

FIG. 34 and FIG. 35 are diagram for a data structure of grouping criteria for signaling SGDD grouped per virtual channel map according to one embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way.

For instance, such a terminology as a network device is used in this disclosure. And, this terminology can correspond to one of an IPTV (Internet Protocol TeleVision), an ITF (IPTV Terminal Function), a digital television, a mobile device and the like.

Figure 1:
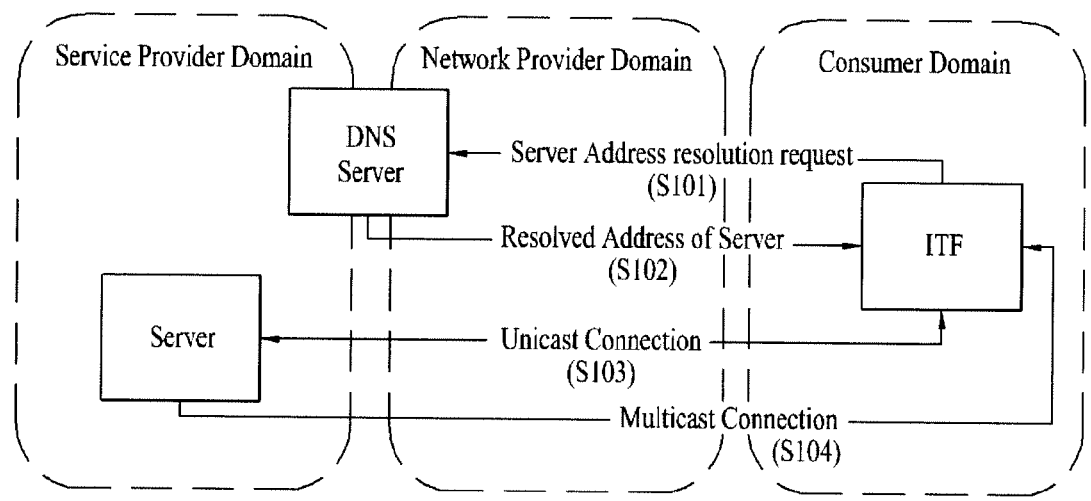
FIG. 1 is a diagram for an IPTV service according to one embodiment of the present invention.

FIG. 1 is a diagram for an IPTV service according to one embodiment of the present invention.

First of all, a service address on IP is determined as URL type for example and an ITF makes a request for an IP address and the like to a DNS server and then receives the requested IP address and the like. The ITF accesses a server by multicast or unicast.

Referring to FIG. 1, an ITF makes a server address resolution request (S101). The ITF receives a resolved address of server from a DNS server (S102). The ITF is connected to a server by a unicast (S103) or a multicast (S104).

Figure 2:
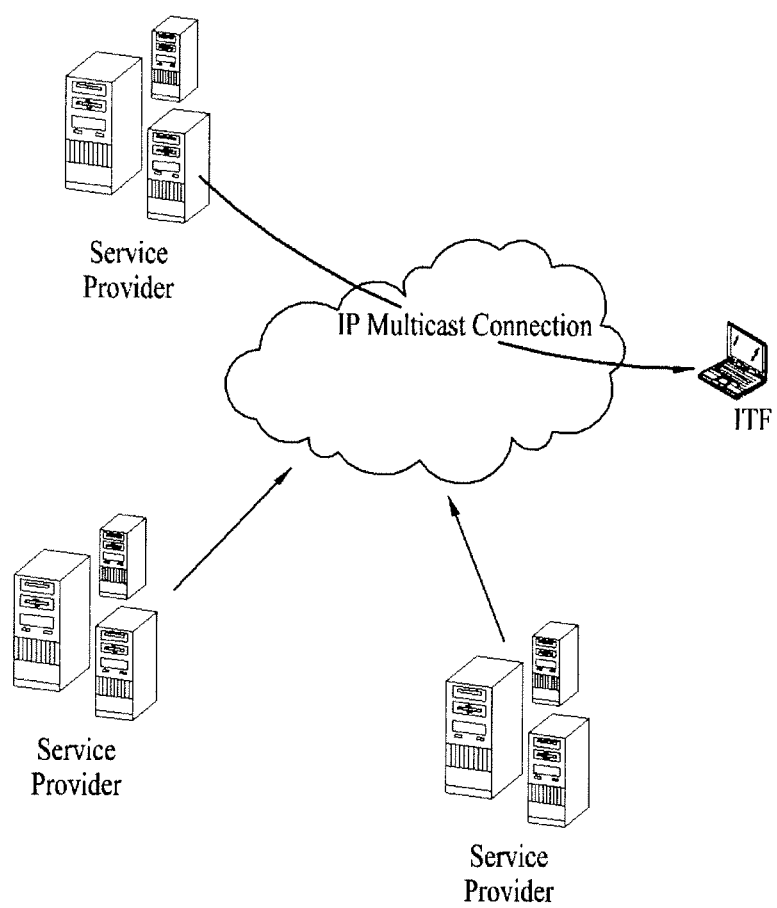
FIG. 2 is a diagram for a multicast method according to one embodiment of the present invention.

FIG. 2 is a diagram for a multicast method according to one embodiment of the present invention.

Referring to FIG. 2, although a plurality of ITFs join a single multicast stream, 1-to-many connections are achieved instead of 1-to-1 access to the server per ITF.

Figure 3:
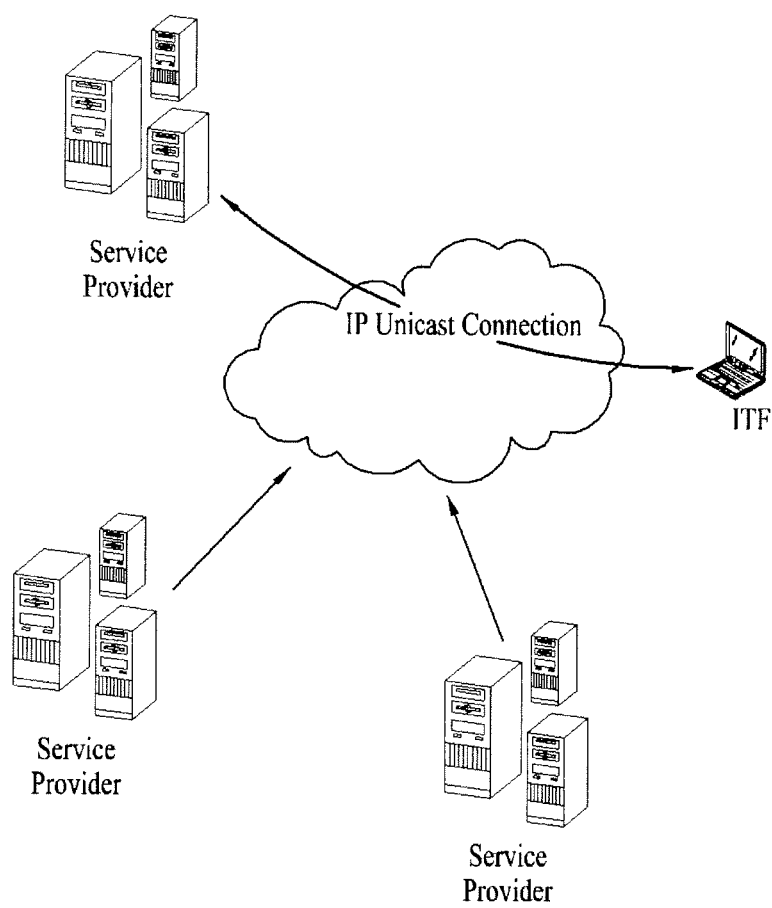
FIG. 3 is a diagram for a unicast method according to one embodiment of the present invention.

FIG. 3 is a diagram for a unicast method according to one embodiment of the present invention.

Referring to FIG. 3, 1-to-1 connection is established between an ITF and a server to transceive data in-between.

Figure 4:
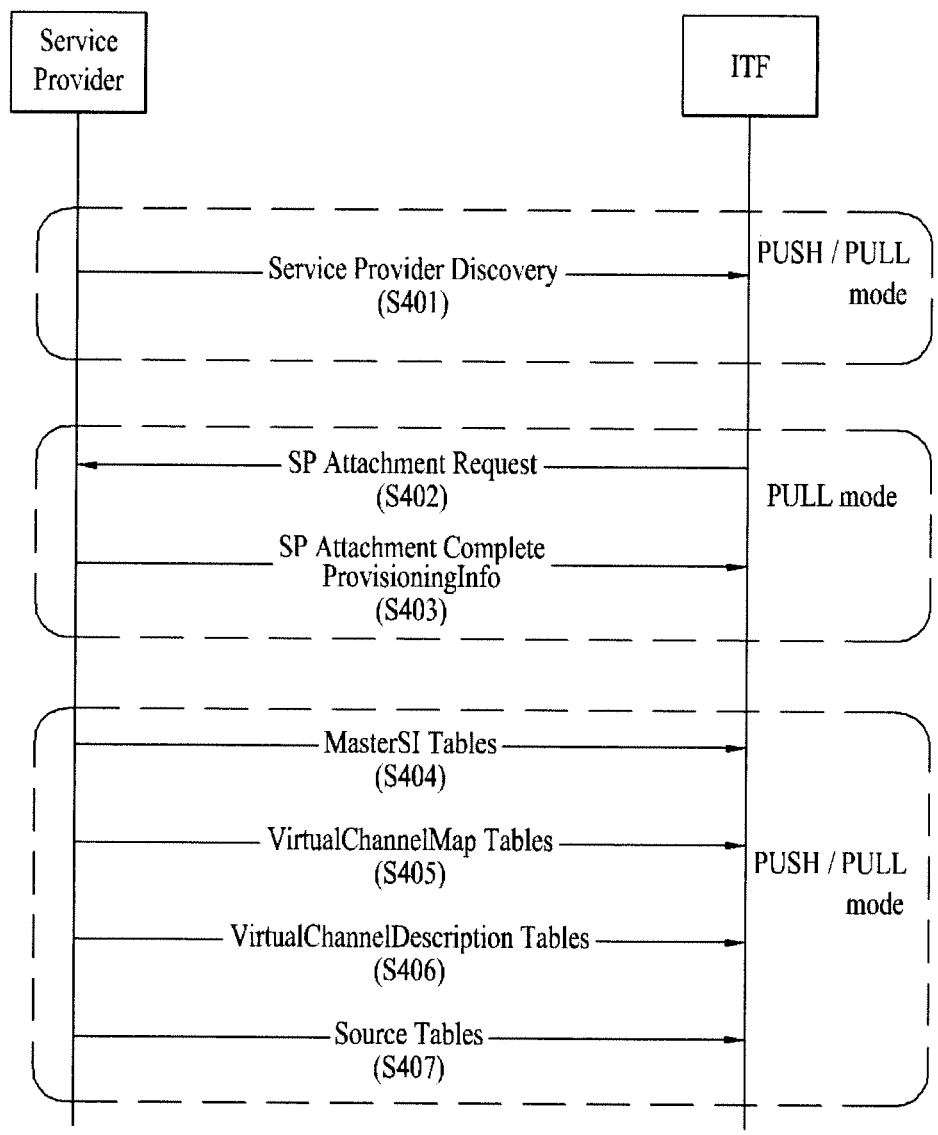
FIG. 4 is a diagram of a process for searching an IPTV service according to one embodiment of the present invention.

FIG. 4 is a diagram of a process for searching an IPTV service according to one embodiment of the present invention.

A service provider performs a service provider discovery (S401). An ITF performs a SP attachment request (S402). The ITF receives provisioning information after SP attachment complete (S403). Furthermore, the ITF receives master SI tables from the service provider (S404), receives virtual channel map tables from the service provider (S405), receives virtual channel description tables from the service provider (S406), and receives source tables from the service provider (S407).

This is explained in detail as follows.

First of all, the service provider discovery can mean a process for service providers providing services related to IPTV to discover a server that provides information on services provided by the service providers. A method for discovering an address list for obtaining information (e.g., SP discovery information) on an SD (service discovery) server includes one of the three kinds of methods for example. First of all, it is able to use an address preset in the ITF or an address manually set by a user. Secondly, it is able to use a DHCP based SP discovery method (e.g., DHCP option). Thirdly, it is able to use a DNS SRV-based SP discovery method (e.g., DNS SRV mechanism).

Moreover, the ITF accesses a server at the address obtained by one of the above three kinds of methods and then receives a service provider discovery record containing information necessary for the per-SP service discovery. Subsequently, the ITF performs a service searching step using the received service provider discovery record. Theses steps are available for one of a push mode and a pull mode.

The ITF accesses an SP attachment server designated as an SP attachment locator of the SP discovery record and then performs an ITF registration procedure (or a service attachment procedure). In this case, information delivered to the server from the ITF can have a format of an ITF registration input type record. Alternatively, it is able to perform the service attachment procedure using information of a query term type of HTTP GET method.

Moreover, the ITF accesses an authentication service server of SP, which is designated as an SP authentication locator, performs a separate authentication procedure, and is then able to perform a service authentication procedure.

Meanwhile, after the service attachment procedure has been successfully completed, data transmitted to the ITF by the server can have a format of a provisioning information table.

In the service attachment procedure, the ITF transmits the data to the server in a manner that its ID and location information are contained in the data. Subsequently, the service attachment server is able to specify a service the ITF has subscribed based on the received ID and location information. Moreover, address information, from which the ITF can obtain service information, is provided as a provisioning information table. This address information corresponds to access information of a master SI table. In case of using this method, it is facilitated to provide a subscriber-specific service.

The service information includes access information on a virtual channel map, a master SI table record for managing a version, a virtual channel map table for providing a service list of a package type, and a virtual channel description table including detailed information of each channel, a source table including access information for accessing a service actually, and the like.

Figure 5:
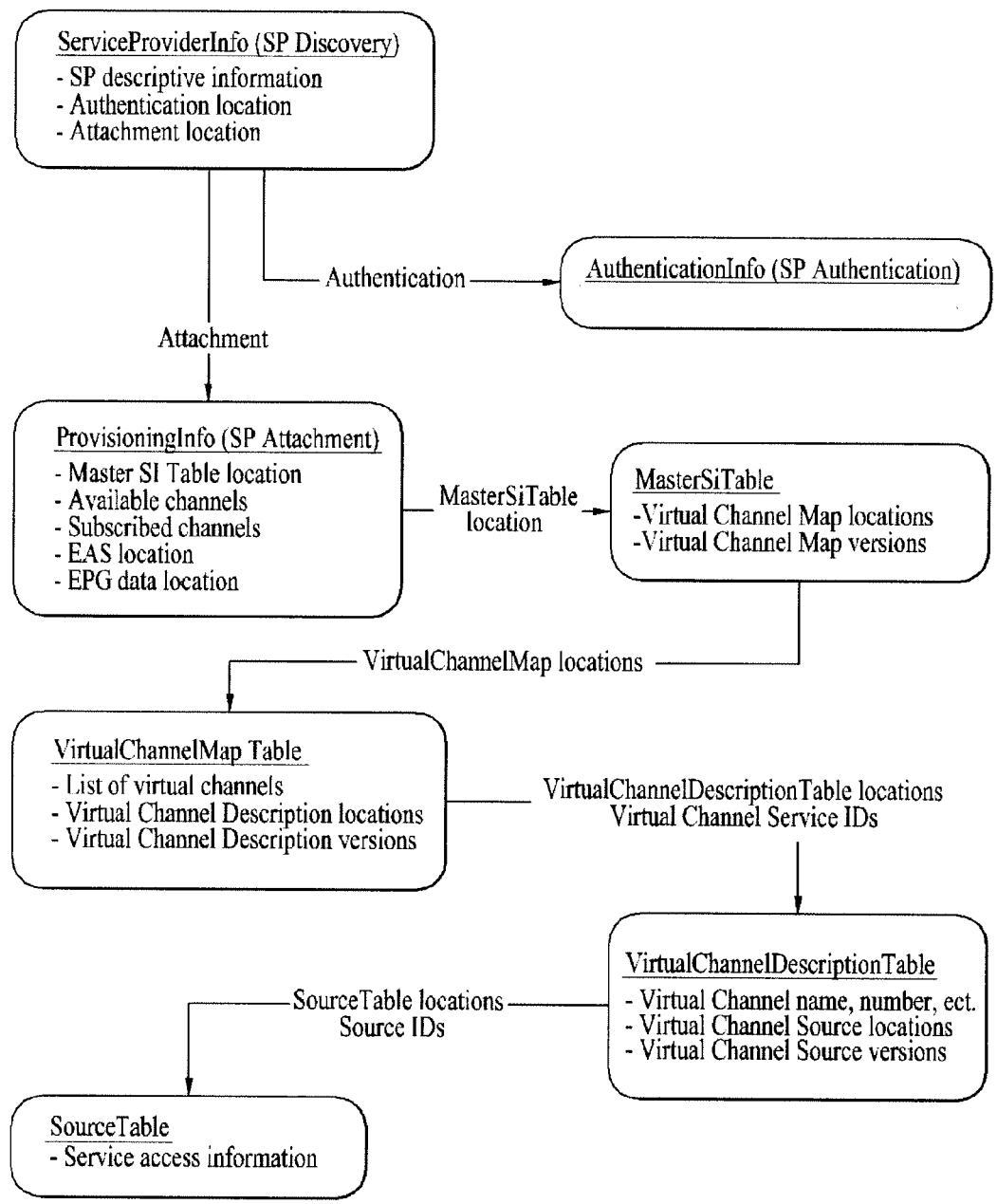
FIG. 5 is a detailed diagram of FIG. 4.

FIG. 5 is a detailed diagram of FIG. 4. Inter-data relations within SI are described with reference to FIG. 5 as follows.

Referring to FIG. 5, a master SI table includes location information for receiving each virtual channel map and version information of each virtual channel map. Each virtual channel map is uniquely identified via a virtual channel map identifier and the virtual channel map version indicates version information of the virtual channel map. In case that one of all tables connected in direction of arrow starting with the master SI table is changed, versions of all higher tables (up to master SI table) are incremented together with version increment of the corresponding table. Thus, by monitoring the master SI table, it is advantageous in that the change in the whole SI table can be directly checked.

For instance, in case that a change occurs in the source table, a version of the source table is incremented and a version of the virtual channel description table for referring to the source table is changed as well. Therefore, the change of the lower table causes a change of a higher table, whereby the version of the master SI table is eventually changed.

A single master SI table can exist per service provider. In case that a configuration of a service differs per region or subscriber (or subscriber group), the service provider designs a plurality of master SI tables to provide a customized service per unit. In case of this design, a customized service fit for a region of a subscriber, subscription information and the like can be efficiently provided via the master SI table.

The virtual channel map table can have at last one virtual channel and includes location information for obtaining channel detail information instead of having the channel detail information contained in the virtual channel map. The virtual channel description of the virtual channel map indicates a location of a virtual channel description table containing the channel detail information.

The virtual channel description table contains detail information of virtual channel. And, it is able to access the virtual channel description table using the virtual channel location in the virtual channel map table.

Meanwhile, a method of delivering the virtual channel description table can use one of the following four kinds of methods.

First of all, using a single global multicast stream, a virtual channel description table of all channels provided by the service provider is transmitted. According to this design, as mentioned in the foregoing description, the virtual channel map table needs not to indicate the address of the detail information per virtual channel but an address of the global multicast stream is just included in the provisioning information table.

Secondly, there is a method of providing a single multicast stream per region. This second method provides channel detail information using a separate multicast stream per region, while the aforesaid first method provides channel detail information using a single stream nationwide. In this case, since a region to which the ITF belongs can be specified via the service attachment procedure, it is possible to specify an address of a unique multicast stream per region via PROVISIONING information table.

Thirdly, there is a method of designating a virtual channel description location to a virtual channel map table. If it is able to receive detail information of channel belonging to one channel map at the same address entirely or in part, the detail information is just designated to a virtual channel map table once rather than designated per virtual channel description location. Yet, in case that there exists a channel necessary to obtain detail information at a different address, relevant information is designated to the virtual channel description location again.

Fourthly, referring to FIG. 5, there s a method of designating a location of detail information per channel using a virtual channel description location. A virtual channel service ID of a virtual channel description table is a unique identifier for discriminating a service corresponding to the virtual channel description. Using the virtual channel service ID, it is able to discover a virtual channel description table. In case that a plurality of virtual channel description tables are received by multicast, a multicast stream is joined and a virtual channel description table corresponding to the same virtual channel service ID is then discovered. In case that unicast scheme is applied, a parameter of the virtual channel service ID is transmitted to a server and a specific virtual channel description table is then received only.

The source table provides access information (e.g., IP address, port, AV codec, transport protocol, etc.) necessary for accessing a service actually per service.

The above described master SI table, virtual channel map table, virtual channel description table and source table are delivered via 4 logically separated flows and are available for push mode and pull mode both. Meanwhile, the master SI table monitors can be transmitted by multicast for version management and a version change is monitored by receiving a multicast stream.

Moreover, the above described service provider information includes a service provider ID, a version, an SP logo, an SP name, an SP description, an SP attachment locator, an SP authentication locator and the like for example.

The service provider ID uniquely identifies a service provider and is able to use a registered domain name.

The version indicates a version of a record of the service provider information.

The SP logo specifies a location of a logo image of a service provider and is selectively usable.

The SP name indicates a name of a service provider and can have one name per language.

The SP description is a detailed text description of a service provider and can be provided per language.

The SP attachment locator specifies an address of a service attachment server of a service provider. Meanwhile, a SERVICE attachment procedure necessary for initiating a service of a corresponding service provider is performed via the server.

The SP authentication locator specifies an address of a server to access in case of using a selectively usable authentication procedure.

Figure 6:
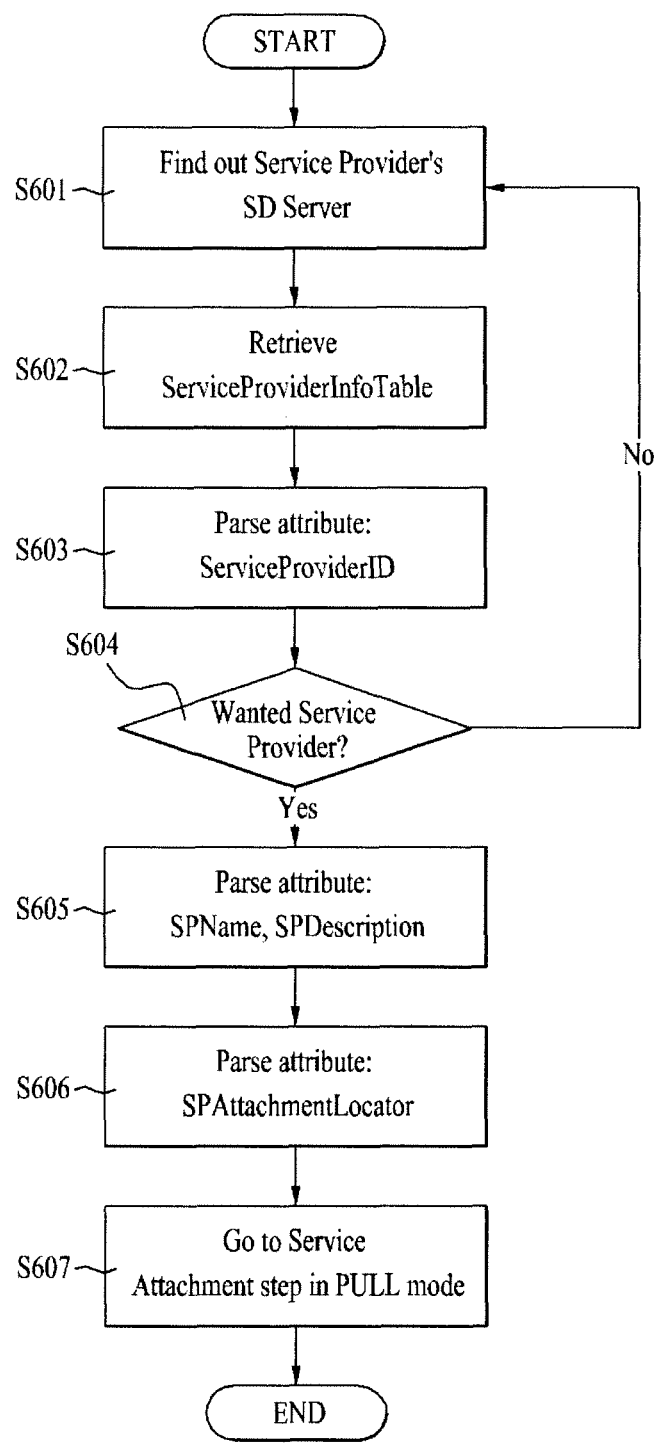
FIG. 6 is a diagram of a process for a network device to perform a service discovery operation according to one embodiment of the present invention.

FIG. 6 is a diagram of a process for a network device to perform a service discovery operation according to one embodiment of the present invention.

Referring to FIG. 6, a network device (e.g., an ITF) according to one embodiment of the present invention includes finds out service provider's SD server (S601). The network device retrieves service provider information table (S602). The network device parses attribute on service provider ID (S603). The network device determines whether wanted service provider is or not (S604).

The network device parses attribute on SP name and SP description (S605). The network device parses attribute on SP attachment locator (S606). The network device goes to service attachment step in pull mode (S607).

Figure 7:
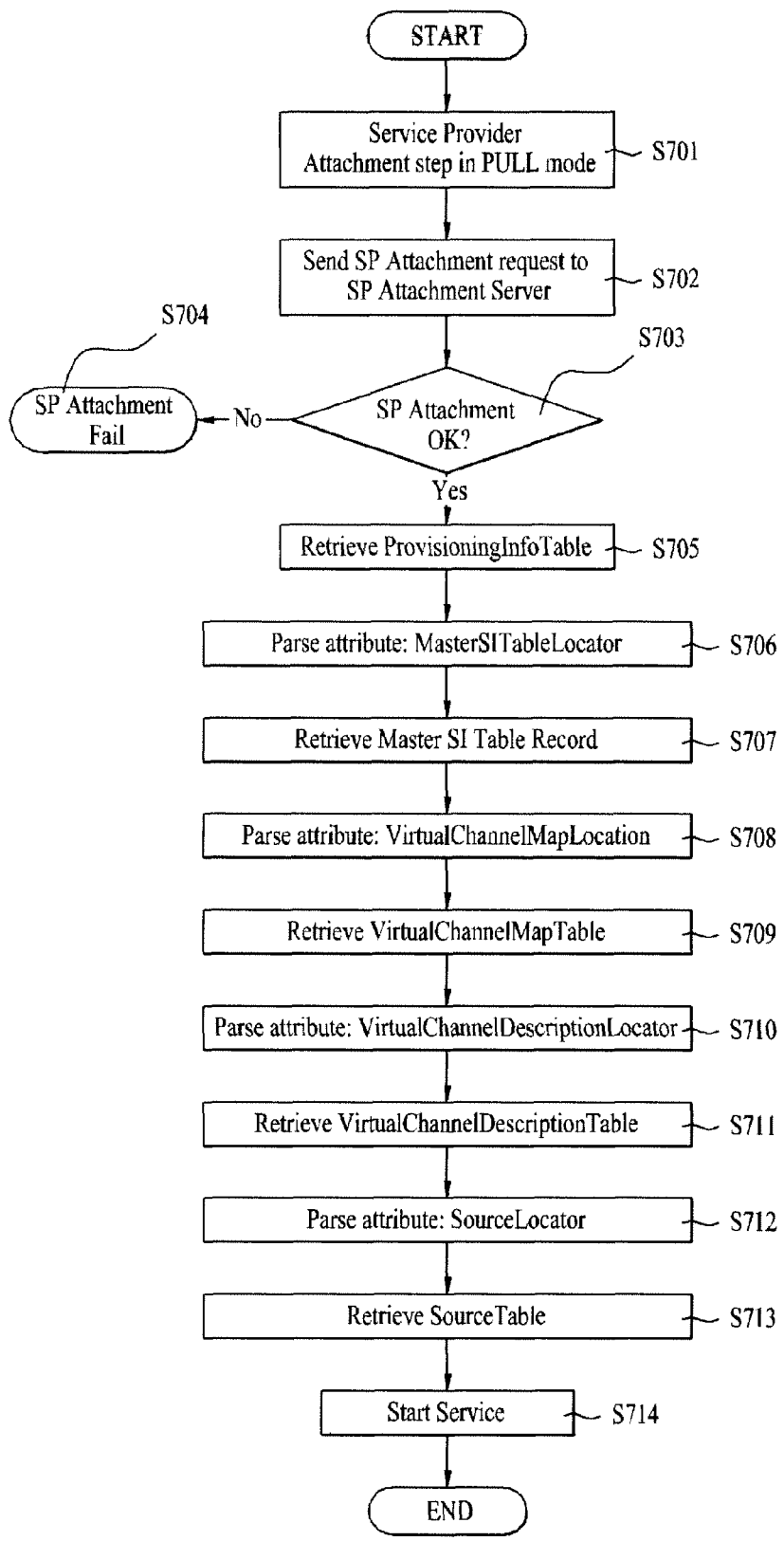
FIG. 7 is a diagram of a process for a network device to perform a service discovery operation according to another embodiment of the present invention.

FIG. 7 is a diagram of a process for a network device to perform a service discovery operation according to another embodiment of the present invention. The flow shown in FIG. 7 can be performed after completion of the steps shown in FIG. 6 for example.

The network device performs a service provider attachment step in pull mode(S701). The network device sends SP attachment request to SP attachment server(S702). The network device determines whether SP attachment is OK(S703). If no, the network device recognizes that the SP attachment is fail(S704). If yes, the network device retrieves provisioning information table(S705). The network device parses attribute on master SI table locator(S706). The network device retrieves master SI table(S707). The network device parses attribute on virtual channel map location(S708). The network device retrieves virtual channel map table(S709).

Furthermore, the network device parses attribute on virtual channel description locator(S710). The network device retrieves virtual channel description table(S711). The network device parses attribute on source locator(S712). The network device retrieves source table(S713). The network device starts service(S714).

Figure 8:
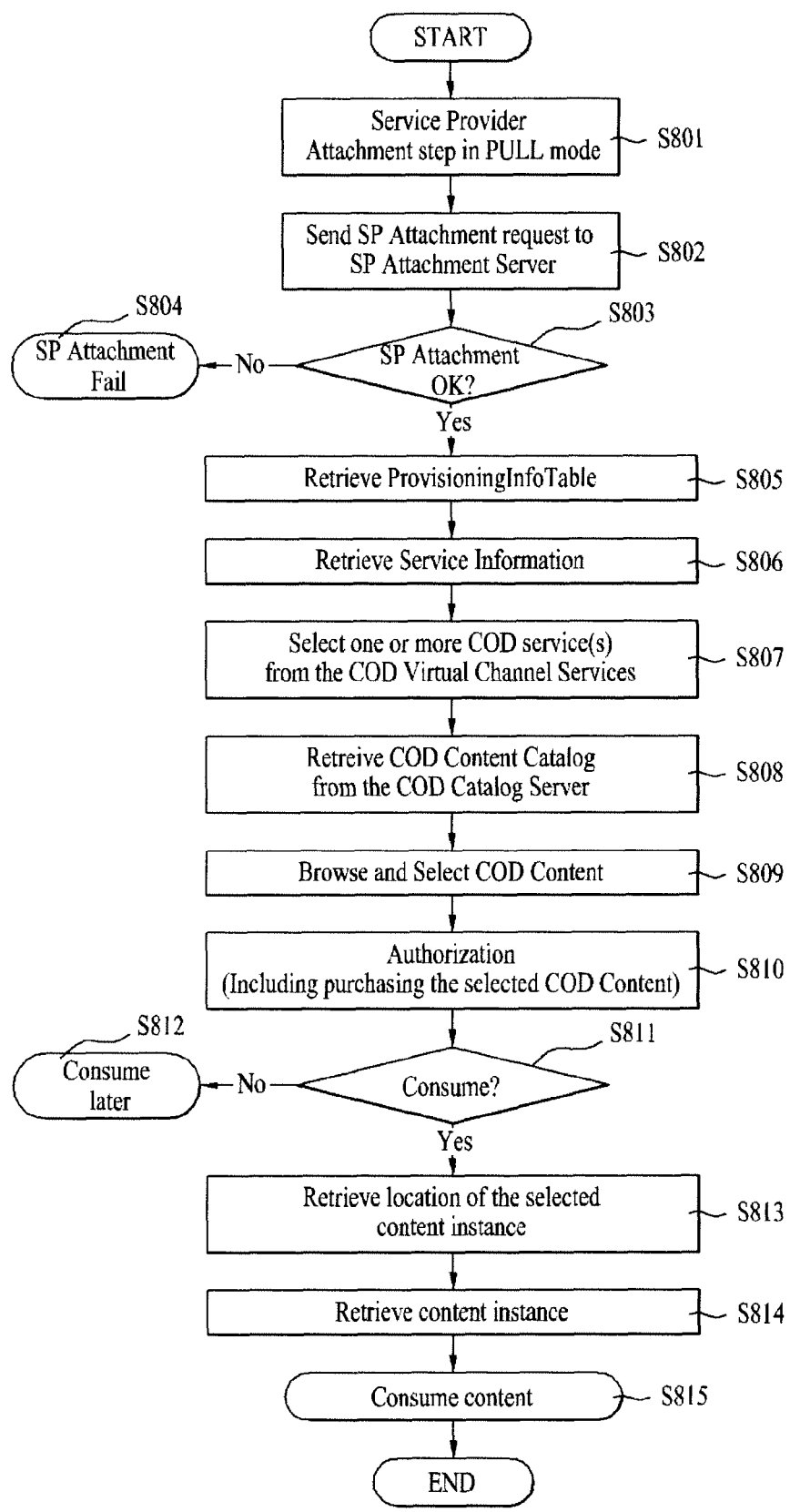
FIG. 8 is a diagram of a process for a network device to process a COD service according to a further embodiment of the present invention.

FIG. 8 is a diagram of a process for a network device to process a COD service according to a further embodiment of the present invention.

The network device performs a service provider attachment step in pull mode (S801). The network device sends SP attachment request to SP attachment server (S802). The network device determines whether SP attachment is OK or not (S803). If no, the network device recognizes that the SP attachment fails (S804). If yes, the network device retrieves provisioning information table (S805). The network device retrieves service information (S806). The network device selects one or more COD services from the COD virtual channel services (S807).

The network device retrieves COD content catalog from COD catalog server (S808). The network device browses and selects COD content (S809). The network device performs an authorization including purchasing the selected COD content (S810). Yet, the step S808 and the step S809 shall be described in detail later in this disclosure.

Moreover, the network device determines whether the content will be consumed (S811). If no, the network device will consume the content later (S812). If yes, the network device retrieves location of the selected content instance (S813). The network device retrieves content instance (S814). And, the network device consumes the content (S815).

FIG. 8 shows an operation of a thick client that receives and processes metadata.

The thick client receives service information and then processes SI metadata. A use of a COD service is initiated by selecting a COD virtual channel service from the processed metadata. The thick client obtains an address of a COD catalog server to obtain a COD content list and detail information included in the COD service. The thick client accesses the address and then obtains content catalog information. The thick client selects a content to consume via such a process as browsing, navigation, searching and the like using the obtained content catalog information and then acquires consumption authority via an authorization procedure. This authorization procedure includes the steps of purchasing, usage terms, payment, settlement and the like. After acquisition of the consumption authority, the thick client obtains location information of an instance of a content to consume. Afterwards, the thick client accesses the content instance based on the obtained location information and then consumes the corresponding content.

On the other hand, in case of the thin client, there are two kinds of schemes for accessing a COD service portal.

According to a first scheme, the thin client accesses a COD service main portal page accessible to all COD services specified in a provisioning information table and then uses a corresponding service.

According to a second scheme, selection of a COD service is performed based on the received SI information. In order to use the selected COD service, a portal page of the corresponding COD service is directly accessed and the corresponding service is then used.

Yet, according to both of the first and second schemes, after completion of the service selection, using the thin client, a content is selected, authority is acquired, the content is then consumed, via content catalog browsing, navigation, and searching.

Meanwhile, in the above description, the following three kinds of schemes are proposed as a method of browsing the COD content catalog, by which the corresponding method is non-limited. In this case, the terminology 'browsing' includes at least one of navigation and searching or can mean a series of steps of discovering a specific content using the content catalog.

First of all, the thin client executes browsing of a COD content catalog in a manner that a server and a user equipment exchange HTMS based webpage with each other. In particular, since metadata of a content exists in a server side, the thin client performs browsing by receiving a webpage containing a UI and data.

Secondly, a medium level client stores a small quantity of content metadata in a client using various delivery mechanisms and then performs browsing locally. In case that additional metadata is necessary, it is additionally received from a server.

Thirdly, regarding a high level client, a client receives and stores whole COD content catalog and then performs local browsing.

In the following description, the metadata delivery mechanism required for the aforesaid browsing scheme is explained as follows.

Purchasing proceeds via the authorization procedure. Afterwards, information of the purchased content is stored in user's profile information. A user is able to consume the corresponding content right after completion of the purchasing or can consume it via another device at another timing point in the future. In a manner of managing purchase list information via user profile, one device at the purchasing point and another device at the consuming point can be separated from each other.

In case of consuming a purchased content, it is necessary to acquire access information on a consumable instance of a real content based on a globally unique content ID that is a unique identifier of the purchased content. For this, in a proposed scheme according to one embodiment of the present invention, a real content instance is discovered via the above described source table.

Usages of the metadata browsing method are not just limited to the COD service and are applicable to using metadata of IPTV services, which will be introduced in various ways in the future, as well as a linear TV service.

Content metadata delivery mechanism proposed by the present invention includes 2-layered content metadata delivery scheme shown in the following. Of course, the 2-layer configuration is just exemplary and the configuration design is extensible over 3 layers.

According to one embodiment of the present invention, base-layer metadata delivery channel and 2-nd layer metadata delivery channel are separately defined.

The Base-layer Metadata Delivery Channel means a metadata delivery channel configured with lest information necessary for content selection. Conventional metadata has flexibility in delivering metadata information on all items that can be assumed. As this flexibility is allowed, if the number of contents is considerably incremented, a size of metadata information on a whole list can increase too large to be received and processed by a user equipment. Hence, the following scheme for enabling a user equipment to perform browsing is useful in a manner of restricting this flexibility partially for fast content browsing, defining minimum necessary metadata, and then delivering the defined metadata to the user equipment quickly.

Eve if the number of contents is considerably large, a size of information is minimized into a level of delivering metadata information of a whole content quickly to a user equipment. In this case, a stream or channel for delivering the size-minimized information shall be defined as a base-layer metadata delivery channel. If this scheme is used, it is also advantageous in that such a user equipment, which is incapable of processing vast metadata, as a storage-space-limited user equipment, a function-limited user equipment and the like is able to process the minimized metadata information.

Since a size of the base layer is minimized, the base layer is received by a user equipment in a manner of being carried on a multicast stream or the like and is then used. Alternatively, the base layer can be delivered by unicast or the like.

The 2-nd Layer Metadata Delivery Channel means an additional metadata delivery channel that delivers the former metadata carries on the base layer. Since the base layer contains very basic metadata items only, additional metadata may be necessary to help user's content selection. A channel for carrying the additional metadata is intended to be delivered via separate 2-nd Layer Metadata Delivery Channel.

This 2-nd layer metadata can be delivered via one of the following three kinds of schemes.

First of all, there is HTTP or SOAP Query scheme. A request for additional metadata of a content selected via base-layer metadata is made to a server by HTTP or SOAP query and the requested additional metadata can be received.

Secondly, there is a unicast scheme. A request for whole 2-nd layer metadata is made to a server, the corresponding metadata is received, and Local Browsing/Search/Navigation can be then performed.

Thirdly, there is a multicast scheme. In case that whole 2-nd Layer Metadata is transmitted by Multicast, a user equipment joins and receives the corresponding multicast stream and is then able to perform Local Browsing/Search/Navigation.

Thus, in case that metadata is provided by discriminating a separate channel, a service provided can be provided with the following diverse flexibility and efficiency in providing metadata.

First of all, local browsing can be performed in a manner of delivering metadata corresponding to a base layer to a user equipment and enabling the delivered metadata to be stored in the user equipment. If local browsing is performed in a manner of storing content metadata in a user equipment, it is able to reduce server load and network use quantity smaller than those of the scheme performed in a manner of requesting, receiving and processing metadata remaining in a server by a user equipment. And, a processing speed of the user's request is raised to enable fast service provision.

Moreover, when metadata is left in a server, in case that a user equipment interactively makes a request for the metadata to the server, it is able to use the base-layer metadata as well. Moreover, usages of the metadata delivery scheme are not just limited to the COD service and are applicable to using metadata of IPTV services, which will be introduced in various ways in the future, as well as a linear TV service.

Figure 9:
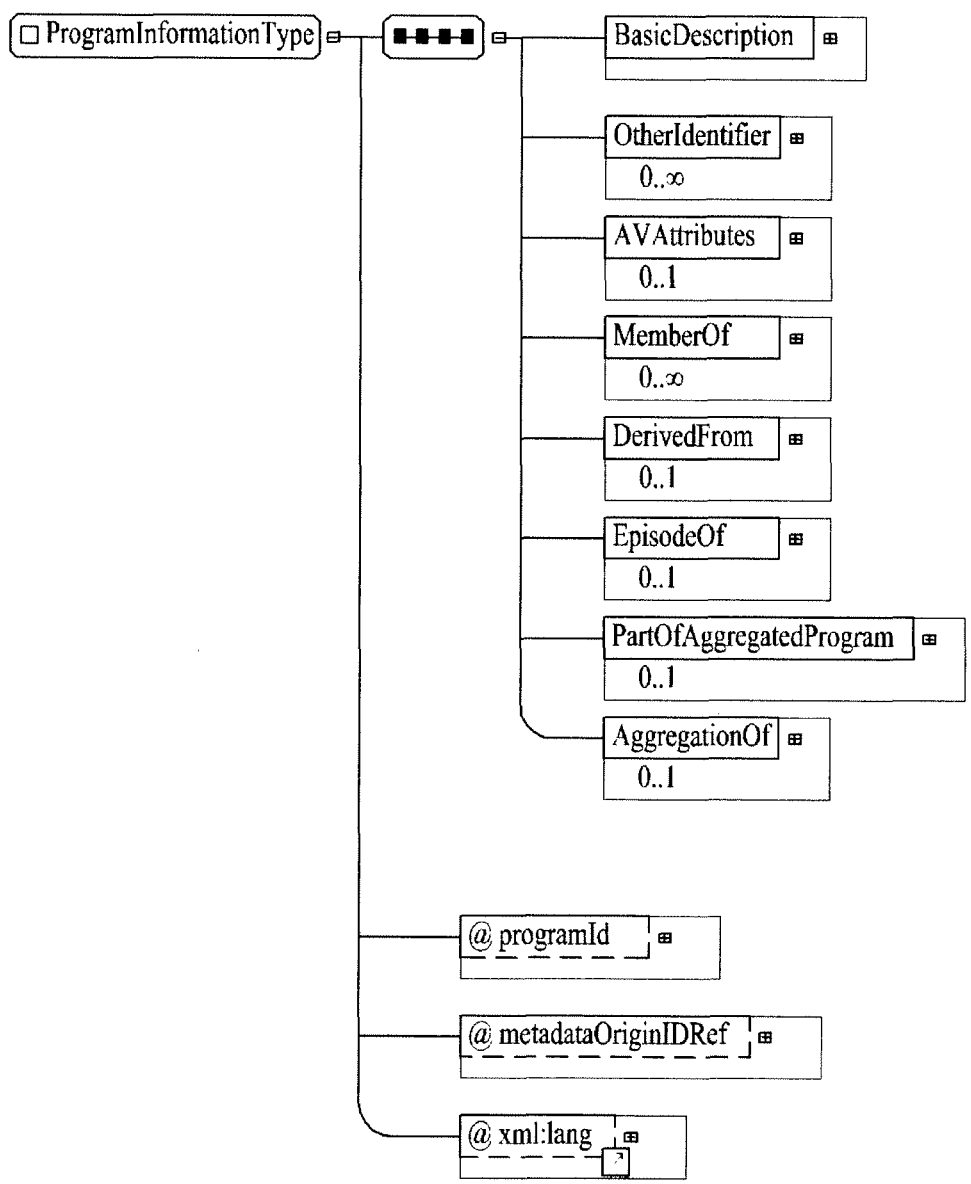

FIG. 9 and FIG. 10 are diagrams for a data structure of program information according to one embodiment of the present invention, respectively.

Referring to FIG. 9 and FIG. 10, content metadata for a base layer can be limited to include three kinds of elements (e.g., program ID, AV attribute, basic description, etc.) only. Other attributes and subordinate elements can be delivered via an additional layer equal to or greater than 2-nd layer.

The program ID is the information for uniquely identifying a program described by program information.

The AV attribute defines media attribute information (e.g., codec, size, etc.) of audio/video of program and the like.

Figure 11:
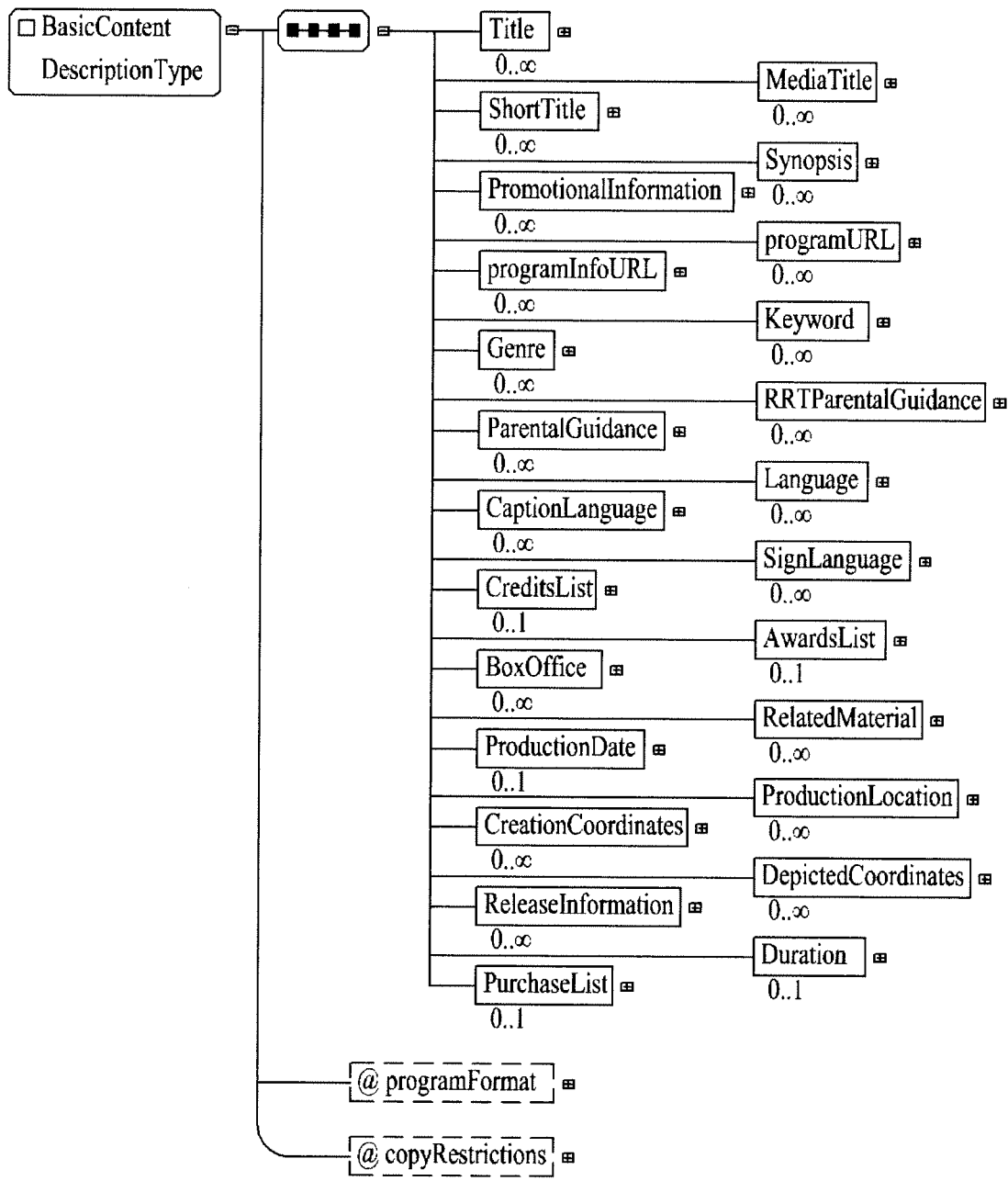

The basic description shall be explained in detail in the descriptions with reference to FIG. 11 and FIG. 12.

FIG. 11 and FIG. 12 are diagrams for a data structure of basic content description according to one embodiment of the present invention, respectively.

First of all, metadata for a base layer is designed to include the following seven kinds of items only for example. Other elements are not carried on the base layer but can be carried on an additional layer over 2-nd layer.

1. ShortTitle: Title of program supporting maximum 80 English letters
2. ProgramInfoURL: URL for obtaining additional program information
3. Genre: Indicating a genre of program
4. RRTParentalGuidance: Delivering a rating value according to a parental guidance system regulated by ATSC PSIP standard
5. Language: Description of supported audio language
6. CaptionLanguage: Description of supported caption language
7. SignLanguage: description of supported Sign language If a base layer is limited to the minimum, it can be used by being limited in the above manner. Besides, various embodiments for the definitions of metadata items transmittable per layer can exist. In case of configuration with N-layer instead of 2-layer configuration, metadata are available in a manner of being profiled into more various types.

This is applicable to the case of providing EPG metadata of a plurality off linear TV services as well as massive COD contents. If the number of channels is further incremented, a size of EPG metadata for a real-time broadcast can't help increasing. Therefore, the 2-layer or higher layer (n-layer) metadata delivery scheme is very usefully available.

According to another embodiment of the present invention, proposed is a method of configuring and delivering 3-layer (or higher layer: n-layer) metadata instead of the above 2-layer scheme.

This is to provide a different quantity of metadata by differentiating a detail of information of metadata in each step despite providing information on a content of a same size. Thus, schematic information on massive contents is quickly provided using a small quantity of metadata for list reception, query and the like. If a user attempts to view detailed information, it is able to provide information on a content of a small size more accurately.

In order to differentiate detail of information, the information configuration of the following three steps is described for example.

First of all, a list layer is defined. The object of the list layer is to provide a list. By providing minimum information per content, it is able to efficiently transmit information on massive contents once.

Secondly, a lite layer EPG is defined. Although the configuration off information is minimized to enable such a user equipment, which has a limited screen size, limited storage space and limited CPU processing capability, as a mobile phone to process the corresponding information sufficiently, this configuration is set suitable for a level necessary to select a content. This layer has information more than that of the above described list layer but is abbreviated smaller than a full layer EPG in the following.

Thirdly, a full layer EPG is defined. This configuration contains most detailed information capable of carrying every kind of metadata.

The fill layer EPG is the most detailed step of using every metadata element defined in EPG metadata without no restriction. The rest of two steps can be configured according to the restrictions as follows.

In this case, the content metadata for list can be limitedly usable in a manner of using the following attributes and subordinate elements only.

1. ProgramID: This identifier uniquely identifies a program (content) described by this program information.
2. BasicDescription: This is limited to include a part described in the following only.

The Basic Content Description provides basic informations on a program (content), a group including a set of the programs or a SuperGroup including a set of the groups. And, metadata for list is set to include the following items only among the basic informations. This restriction is applicable to all of the Program, Group, and SuperGroup.

1. ShortTitle: Title of program supporting maximum 80 English letters
2. Genre: Indicating a genre of program
3. RRTParentalGuidance: Delivering a rating value according to a parental guidance system regulated by ATSC PSIP standard
4. Language: Description of supported audio language
5. CaptionLanguage: Description of supported caption language Yet, elements for the aforesaid list layer are just exemplary. Optionally, it is able to modify detailed elements in necessity of those skilled in the art.

In this case, the content metadata for lit can be limitedly usable in a manner of using the following attributes and subordinate elements only.

1. ProgramID: This identifier uniquely identifies a program (content) described by this program information.

2. AVAttribute: This describes media attribute information of Audio/Video and the like of program (e.g., Codec, Size, etc.).
3. BasicDescription: This is limited to include a part described in the following only.

The Basic Description is set to include the following elements only.

1. ShortTitle: Title of program supporting maximum 80 English letters
2. PrograminfoURL: URL for obtaining additional program information
3. Genre: Indicating a genre of program
4. RRTParentalGuidance: Delivering a rating value according to a parental guidance system regulated by ATSC PSIP standard
5. Language: Description of supported audio language
6. CaptionLanguage: Description of supported caption language
7. SignLanguage: Description of supported Sign language
8. Synopsis: This is description of text type. In lite EPG, a length attribute value is limited to "short" and 90 English letters. This limitation length is just exemplary or can be set to another value to use.
9. CreditList: This is information on a credited person of program and should include maximum 5 roles (major cast, production, screenplay, etc.) and maximum 3 names per role in direct. Since a separate table for names may not be provided by the lite EPG in consideration of size, it may be appropriate that names of characters essential to describe the work or picture are directly described only.

If the lite EPG is limited to the minimum, the above limitation is available. Various embodiments of more or less definitions of the transmittable metadata items can be provided.

In case of the above 3-step information configuration, one information configuration can be delivered in a manner of configuring a whole delivery layer into 3 steps. Alternatively, the information configuration can be delivered in a manner of being divided into 2 steps by selecting 2-step information configuration from the 3 steps.

The former 2-layer configuration can be regarded as one example for the configuration of Lite EPG and Full EPG.

The XML schema for the EPG Lite Profile is derived from the full EPG XML schema by excluding certain elements and attributes, imposing certain size restrictions on some of the remaining elements and attributes, eliminating certain Classification Schemes, and limiting the terms that can be used in some of the remaining Classification Schemes, as specified below.

EPGMainType: None of its immediate child elements or attributes shall be excluded.
ProgramDescriptionType: The following child elements shall be excluded. The child elements are CreditsInformationTable element, ProgramReviewTable element.
ProgramInformationType: The following child elements shall be excluded. The child elements are DerivedFrom element, and AggregateOf element, and PartOfAggregration element.
GroupInformationType: None of its immediate child elements or attributes shall be excluded.
SuperGroupInformationType: None of its immediate child elements or attributes shall be excluded.
ServiceInformationType: The following child elements and attributes shall be excluded. The child elements are Owner element, ServiceURL element, ParentService element, OriginalChannelNumber element, originalServiceProvider attribute, originalServiceLocation attribute, affiliateNetwork attribute.

Moreover, the ServiceDescription.length attribute of ServiceInformationType shall be restricted to the value "short".

ScheduleType: None of its immediate child elements or attributes shall be excluded.

ScheduleEventType: The following child elements shall be excluded. The child elements are ProgramURL element, InstanceDescription element, EventInfoURL element, RRTParentalGuidance element, ParentalGuidance element, TrickModeRestrictions element, PublishedDuration element, Live element, Repeat element, FirstShowing element, LastShowing element, and Free element.

BroadcastEventType: None of its immediate child elements or attributes shall be excluded.

OnDemandProgramType: The following child elements shall be excluded. The child elements are ProgramURL element, InstanceDescription element, EventInfoURL element, RRTParentalGuidance element, ParentalGuidance element, TrickModeRestrictions element, FirstAvailability element, LastAvailability element, ImmediateViewing element.

OnDemandServiceType: None of its immediate child elements or attributes shall be excluded.

BasicContentDescriptionType: The following child elements shall be excluded. The child elements are Title element, MediaTitle element, PromotionInformation element, ProgramURL element, AwardsList element, BoxOffice element, RelatedMaterial element, ProductionDate element, ProductionLocation element, CreationCoordinates element, DepictedCoordinates element, and the Synopsis.length attribute of such BasicDescription elements shall have the value "short".

Also, for BasicDescription elements which appear in GroupInformation elements or SuperGroupInformation elements, the following additional child elements of BasicContentDescriptionType shall be excluded. The additional child elements are ProgramInfoURL element, CaptionLanguage element, SignLanguage element, CreditsList element, ReleaseInformation element, Duration element, programFormat element, copyRestrictions element.

AVAttributesType: The following child elements shall be excluded. The child elements are FileFormat element, System element, Bitrate element.

AudioAttributesType: The following child elements shall be excluded. The child elements are Coding element, SampleFrequency element, BitsPerSample element.

VideoAttributesType: The following child elements shall be excluded. The child elements are ActiveFormatDescription element, Coding element, FrameRate element.

CreditsItemType: The following child elements and attributes shall be excluded. The child elements are PersonName.dateFrom, PersonName.dateTo, PersonName.type, PersonNameIDRef, OrganizationNameIDRef, Character.dataFrom, Character.dataTo, Character.type.

ClassificationSchemeTable: The following classification schemes are not applicable to the EPG Lite Profile, due to the exclusion of the corresponding elements and attributes from the profile. Therefore, these schemes and any aliases for these schemes shall be excluded from the ClassificationSchemeTable(tva:HowRelatedCS, mpeg7:FileFormatCS, mpeg7:AudioCodingFormatCS, mpeg7:VideoCodingFormatCS, mpeg7:SystemCS)

All terms of the tva:RoleCS classification scheme shall be excluded except for the following two, termID "V106" (Name "Key talent"), termID "V20" (Name "Production Company") and termID "DIRECTOR".

All terms of the tva:ContentCS classification scheme below the top level shall be excluded, leaving only the following terms(Proprietary, Non-fiction, Sports, Fiction/Drama, Amusement/Entertainment, Music, Interactive Games, Leisure/Hobby/Lifestyle, Adult)

The only fragments included for List profile of EPG metadata should be ProgramInformation, GroupInformation, SuperGroupInformation, ServiceInformation, Schedule, and OnDemandService. (The Schedule fragments clearly apply only to scheduled programs, and the GroupInformation and SuperGroupInformation fragments are primarily intended for CoD programs.) The only elements of those fragments included should be those shown below:

ProgramInformation: It may contain only the programId attribute, the MemberOf element and the ShortTitle, Keyword, Genre and ParentalGuidance elements of the BasicDescription element.

GroupInformation and SuperGroupInformation: It may contain only the groupId attribute, the MemberOf element, and the ShortTitle, Keyword and Genre elements of the BasicDescription element.

ServiceInformation: It may contain only the serviceId attribute, and the Name (short form), Logo, and perhaps ServiceGenre elements.

Schedule: It may contain only the serviceIDRef attribute and the ScheduleEvent elements, and each ScheduleEvent element in the Schedule should contain only the Program, InstanceMetadataId, PublishedStartTime and PublishedEndTime elements. (The Program element is just a reference to the programId of the program, and the InstanceMetadataId element is just an identifier for the event.)

OnDemandService: It may contain only the serviceIDRef attribute and the OnDemandPrograms. Each OnDemandProgram should contain only the Program, InstanceMetadataId. StartOfAvailability and EndOfAvailability elements.

The List profile can be defined as follows.

The XML schema for the EPG List Profile is derived from the full EPG XML schema by imposing the restrictions in the list below. Any EPG XML type definitions not mentioned in this list shall remain unchanged in the EPG List Profile.

The following attributes shall not be excluded from any type definition in which they appear, notwithstanding any statements in the bullet items below about excluding all attributes and elements except for those in a specific list:(metadataOriginIDRef attribute, xml:lang attribute, fragmentIdentification attributeGoup)

ProgramDescriptionType: The following child elements shall be excluded:(CreditsInformationTable, ProgramReviewTable, PurchaseInformationTable)

ProgramInformationType: All the attributes and elements except for the following shall be excluded:(programId attribute, BasicDescription.ShortTitle element, BasicDescription.Keyword element, BasicDescription.Genre element, BasicDescription.RRTParentalGuidance element, BasicDescription.ParentalGuidance element, MemberOf element)

GroupInformationType: All the attributes and elements except for the following shall be excluded:(groupId attribute, BasicDescription.ShortTitle element, Basic- Description.Keyword element, BasicDescription.Genre element, MemberOf element)

SupergroupInformationType: All the attributes and elements except for the following shall be excluded: (groupId attribute, level attribute, BasicDescription.ShortTitle element, BasicDescription.Keyword element, BasicDescription.Genre element, MemberOf element)

ServiceInformationType: All the attributes and elements except for the following shall be excluded:(serviceId attribute, Name element, Logo element)

The "length" attribute of the "Name" element shall be restricted to the "short" value.

ScheduleType: All the attributes and elements except for the following shall be excluded:(ScheduleEvent element, serviceIDRef element, ScheduleEventType)

All the attributes and elements except for the following shall be excluded:(Program element, InstanceMetadataId element, PublishedStartTime element, PublishedEndTime element)

OnDemandProgram: All the attributes and elements except for the following shall be excluded:(Program element, InstanceMetadataId element, StartOfAvailability element, EndOfAvailability element, Classification Schemes)

The only classification scheme applicable to the EPG List Profile is tva:ContentCS. All terms of tva:ContentCS below the top level shall be excluded, leaving only the same terms as for the EPG Lite Profile.

In the EPG metadata transmission configured with the above multiple layers, the following three kinds of delivery schemes are proposed. They are applicable to all kinds of services including Linear TV, COD Service and the like.

First of all, a list layer is received after multicast transmission. Afterwards, a detailed layer can be received by making a request by unicast. Thus, information on massive contents can be simplified, multicasted and then stored in a receiver. Based on the received information, an EPG is provided to a user. If the user makes a request for detailed information, the detailed information is received by unicast and the received detailed information is then processed.

Secondly, both a list layer and a lite layer are transmitted by multicast, while a full layer is transmitted by unicast or multicast. In this case, the list layer is more frequently transmitted with higher priority, while the lite layer is less frequently transmitted with lower priority. This is because service provision can be smoothly performed in a manner of receiving a small size information quickly in the first place, providing a next EPG service, and then receiving detailed information slowly.

Thirdly, all layers can be transmitted by unicast. In case that a quantity of a content such as COD is massive, efficiency of navigation and/or browsing is enhanced in a manner of utilizing layers despite sending all data based on the unicast.

Figure 13:
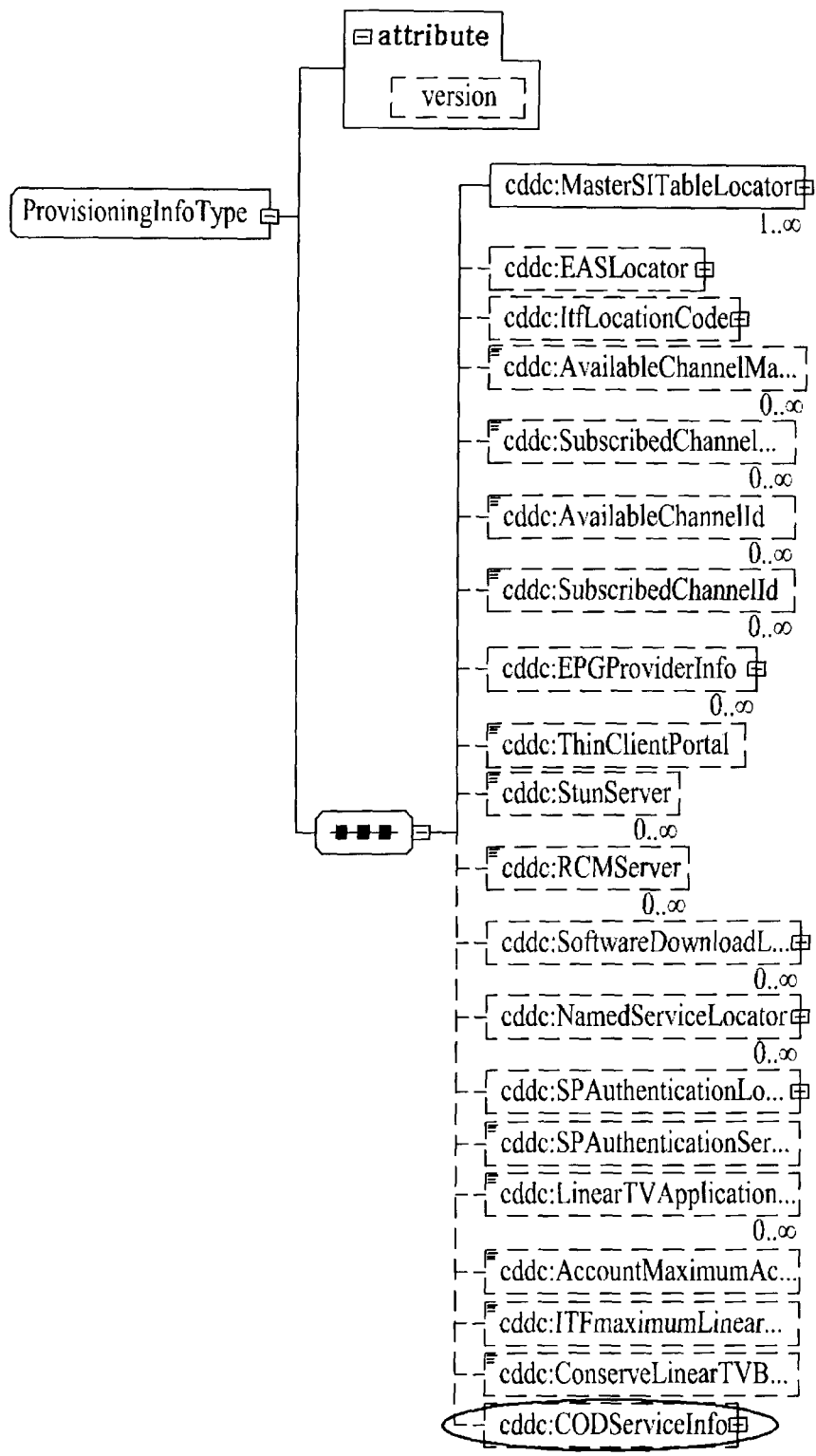
Figure 14:
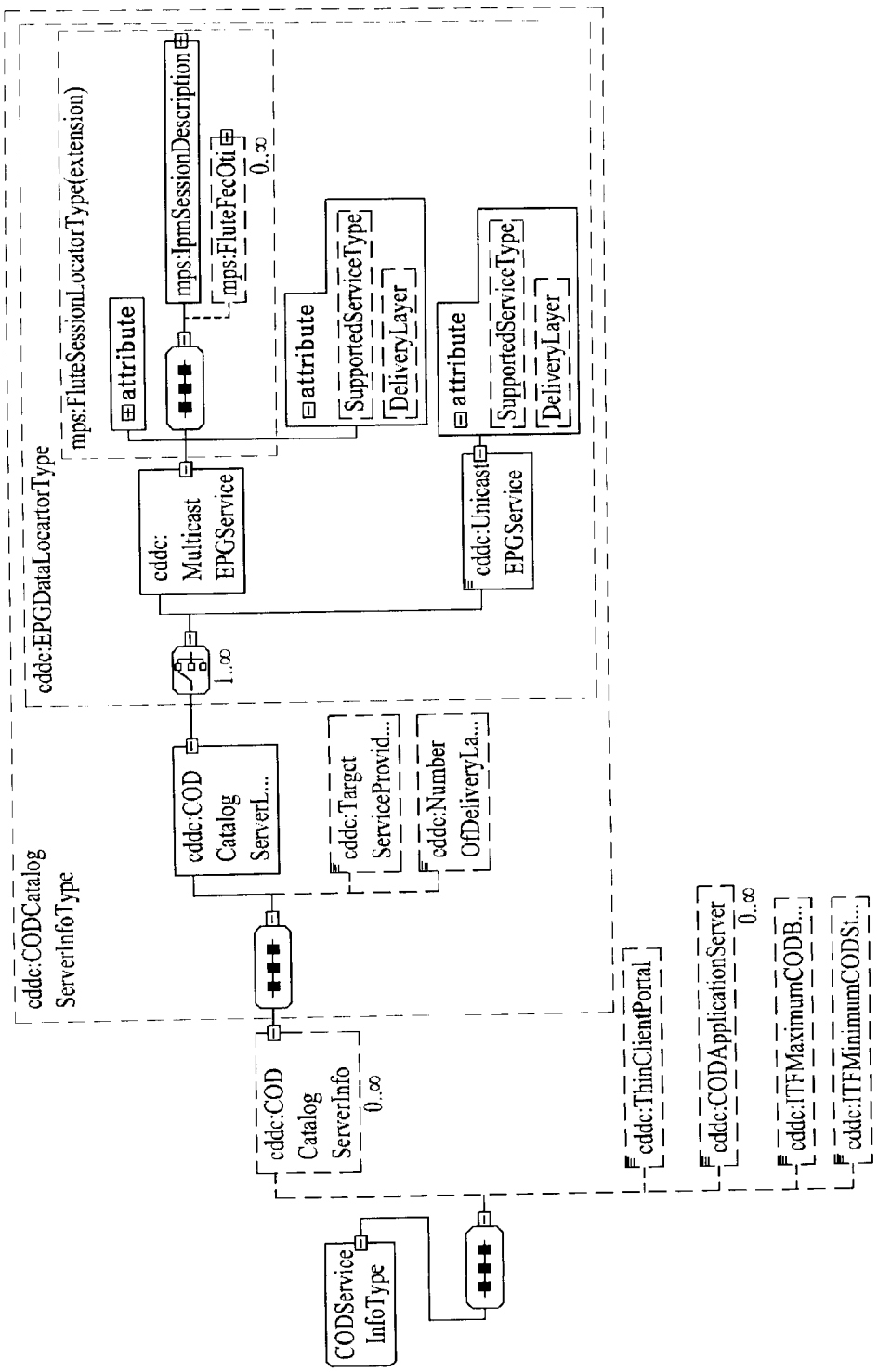

FIGS. 13 to 15 are diagrams for a data structure of provisioning information according to one embodiment of the present invention.

Referring to FIG. 13 and the like, a method of signaling an address of a COD catalog server by extending provisioning information is explained as follows.

For instance, if a service attachment is successfully completed, information transmitted to an ITF by a service attachment server can have a type shown in FIG. 13. According to one embodiment of the present invention, it is intended to make a definition by extending the schema shown in FIG. 13. In particular, referring to FIG. 13, COD service information relevant element is added. The COD service information relevant element is shown in detail in FIG. 14 and FIG. 15.

COD Catalog Server Information provides access information of a server that provides a COD catalog corresponding to a set of metadata information of COD contents. TargetServiceProviderID can be optionally added as a subordinate element. Through this, information provided by the corresponding CODCatalogServer can identify a valid ServiceProvide.

CODCatalogServer provided via Provisioning Information Table is able to provide content metadata about all COD services provided by the corresponding service provider. If a COD Content Metadata storage space possessed by a user equipment is large enough to accommodate total metadata therein, the user equipment accesses CODCatalogServer provided via Provisioning Information Table and is then able to receive all COD Content Metadata provided by a service provider.

If the metadata storage space of the user equipment is not large enough, navigation can be performed in a manner of receiving metadata of a COD service a user attempts to navigate only. This can be supported by a scheme of catalog location provision per COD virtual channel.

And, in order to identify a case that EPG metadata provided by a corresponding EPG provider is delivered via at least two delivery layers like the proposal of one embodiment of the present invention, a subordinate element named "NumberOfDeliveryLayer" is added. Through this added element, it is able to flexibly support a scheme of delivery with extension up to n-layer from the 2-layer metadata delivery. If the added element does not exist, since a separate layer or similar information is not delivered to each EPG data locator, it is constructed with a single layer. On the contrary, if a separate layer or similar information is delivered to the EPG data locator, it means that it is constructed with at least one layer. This can be recognized by parsing all of the EPG data locators.

Moreover, in order to signal the information indicating that metadata carried on the corresponding CODCatalogServerLocation corresponds to which layer, attribute named "DeliveryLayer" is added. A value this attribute can have can include the value according to the format described in the following signaling method and is configured to signal a layer of metadata transmitted from the corresponding CODCatalogServerLocation.

Thus, a method of specifying a profile of EPG metadata delivered from a corresponding source is available as well as the method of signaling a corresponding layer in direct. If EPG metadata for a base layer defined according to one embodiment of the present invention is defined as "Lightweight EPG Metadata Profile", the same effect can be obtained in a manner of specifying this profile information. This can be more useful in case of extension to n-layer. In case that a layer configuration is differentiated per service provider, it is advantageous in that indication of an accurate EPG metadata profile is more effective than indication of a layer in prescribed order.

A receiver is able to receive EPG metadata by selecting one of several EPG data locations in consideration of a processing capability of the receiver and a type of EPG data needed by a user currently.

If ThinClientPortal supports 'thin client' corresponding to a scheme of using a service via HTTP browser, it provides a URI of a thin client portal that provides the service. ThinClientPortal URI included in COD service information in Provisioning Information Table can be regarded as a URL of a main page accessible to all COD services of a service provider.

CODAppilcationServer specifies an address of a specific application server that performs "COD Application" function.

The COD Application Function performs Content Search/Navigation/Selection function and Content Terms/Payment/Settlement function as a server-side function of supporting such a process necessary to use a COD service as browsing, searching, selection, purchase and the like.

If this address is not specified, an SD server or a catalog server performs the same function or a communication with a COD application server is transparently routed to an IPTV client.

It is able to selectively specify ITFMaximumCODBandwidth to specify a maximum bandwidth of an access link to use in using a COD service.

If ITFMinimumCODStorageSpace is specified, a minimum size of a content storage space of a user equipment, which is necessary to use a COD service of SP is specified. If this value is not specified, it may be indicate that a separate storage space is not necessary for using a COD service.

Figure 16:
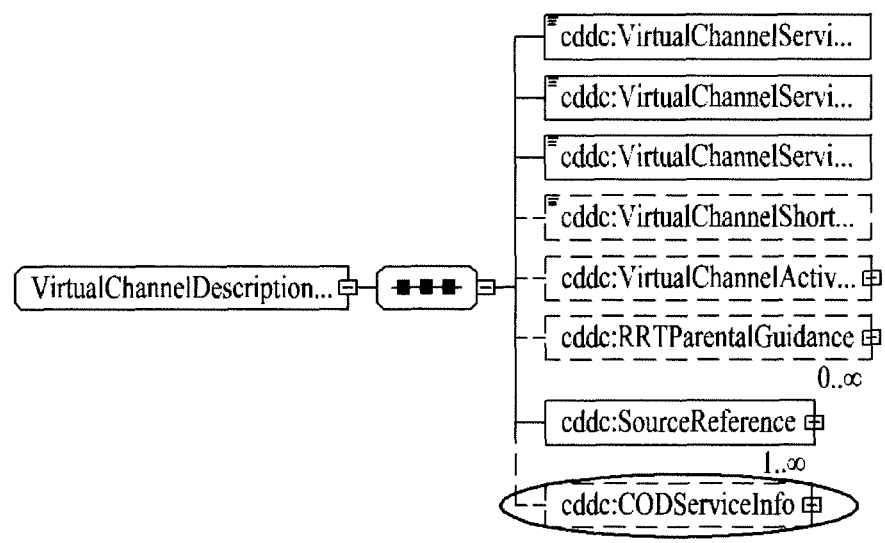
FIG. 16 is a diagram for a data structure of virtual channel description according to one embodiment of the present invention.

FIG. 16 is a diagram for a data structure of virtual channel description according to one embodiment of the present invention. With reference to FIG. 16 and the like, a method of signaling an address of a COD catalog server by extending a virtual channel description is described as follows.

According to one embodiment of the present invention, a method of processing a COD (content on demand) service by extending a virtual channel description table is proposed.

Referring to FIG. 16, by extending VirtualChannelDescriptionType, it is intended to provide COD service relevant information. In particular, as shown in FIG. 18, COD service information relevant element is added.

CODCatalogServerInfo provides access information of an access server that provides a COD catalog as a metadata information set of COD contents. It is able to selectively provide TargetServiceProviderID as a subordinate element. Through this, it is able to identify ServiceProviderof which information provided by CODCatalogServer is valid.

The CODCatalogServer provided via VirtualChannelDescriptionType is a server that provides information on the specific VirtualChannel Service. Through this, it is able to provide COD metadata through a separate COD CatalogServer per COD VirtualChannel service. Through this, a receiver selectively receives metadata of the subscribed service or the COD service currently accessed to use and is then able to use the received metadata.

In the same manner of the signaling method by extending the above described ProvisioningInfo, element and attribute for signaling an EPG metadata delivery layer are added. Based on them, a receiver is able to select and receive an appropriate EPG metadata location based on its processing capability, a user's request content and the like.

In case of supporting 'thin client' as a scheme of using a service via HTTP Browser, ThinClientPortal provides a URI of Thin Client Portal. TheThinClientPortal URI included in CODServiceInfo on VirtualChannelDescriptionType can be regarded as a URI of a specific service page accessible to a corresponding VirtualChannel Service described by VirtualChannelDescriptionType.

CODAppilcationServer specifies an address of a specific application server configured to perform "COD Application" Function.

The COD Application Function performs Content Search/Navigation/Selection function and Content Terms/Payment/Settlement function as a server-side function of supporting such a process necessary to use a COD service as browsing, searching, selection, purchase and the like.

If this address is not specified, an SD server or a catalog server performs these functions or a communication with a COD application server is transparently routed to an IPTV client.

In case of CODApplicationServer provided via VirtualChannelDescriptionType, when a service is provided via a COD application server different per VirtualChannel Service, this is signaled.

Figure 17:
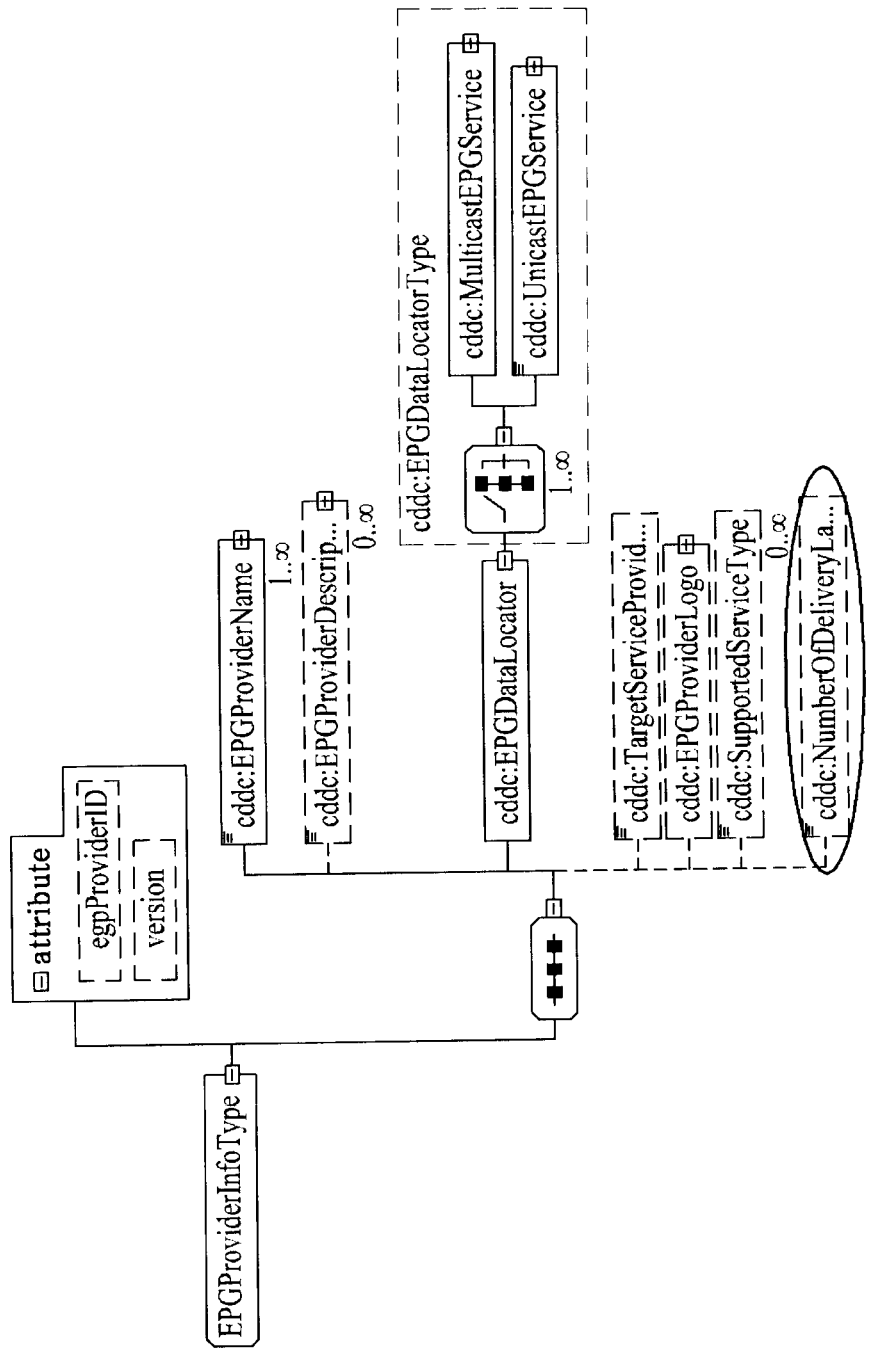

FIGS. 17 to 19 are diagrams for a data structure of EPG provider information according to one embodiment of the present invention, respectively. With reference to FIG. 17 and the like, a method of signaling an address of a COD catalog server using EPG provider information is describe as follows.

In the foregoing description, a scheme of providing COD service information via a provisioning information table has been explained. In case of COD catalog server address and thin client portal in the COD service information, they can be delivered using EPG provider information and thin client portal information. In case of using this scheme, COD catalog server address and thin client portal information are omitted from the COD service information included in the provisioning information and are delivered by the method shown in FIG. 17 and the like.

EPGProviderID shown in FIG. 17 is an identifier that can uniquely identify a provider that provides an EPG. For this, a registered domain name is usable.

Version indicates a version of EPGDiscoveryRecord.

EPGProviderName indicates a text name of an PEG provider and can have one name per language.

EPGProviderDescription contains detailed text description of an EPG provider and can have one description per language.

EPGDataLocation signalsIP address, protocol and the like for receiving EPG data.

TargetServiceProviderID describes IDs of IPTV SP supported by the corresponding EPG provider.

EPGProviderLogo provides a URI of logo of the EPG provider.

Referring to FIG. 17, by extending EPGProviderInfoType defined for a linear TV service, an element named "SupportedServiceType" is added. This indicates types of services including EPG metadata and is able to indicate whether a corresponding EPG provider provides EPG metadata for all services or information on a specific service (e.g. Linear TV and/or COD Service). This is enabled by adding the element named TypeOfSupportedService, as shown in FIG. 18 and FIG. 19.

A value of the element can be set to 'ALL' in case of providing EPG metadata for all kinds of services. In case of providing information on LinearTV, the value can be set to a LinearTV value. In case of providing information on a COD service, the value can be set to a COD service value.

Since SupportedServiceType can be set to 0 to infinity, it can signal all types of supportable services.

In order to identify a case that EPG metadata provided by a corresponding EPG provider is delivered via at least two delivery layers as proposed by one embodiment of the present invention, a subordinate element named "NumberOfDeliveryLayer" is added. Through this element, it is able to flexibly support a scheme of delivery with extension up to n-layer from the 2-layer metadata delivery. If the added element does not exist, since a separate layer or similar information is not delivered to each EPG data locator, it is constructed with a single layer. On the contrary, if a separate layer or similar information is delivered to the EPG data locator, it means that it is constructed with at least one layer. This can be recognized by parsing all of the EPG data locators.

Based on this information, a receiver is able to identify an EPG provider that provides EPG metadata for a COD service. Based on this, the receiver accesses a necessary EPG provider and is then able to receive EPG metadata. Of course, this is identically applicable to information on a service different from the COD service as well.

As another method of identifying a case that EPG metadata provided by a corresponding EPG provider is delivered via at least two delivery layers as proposed by one embodiment of the present invention, proposed is a method of adding a subordinate element named "DeliveryLayer". If the added element does not exist, since a separate layer or similar information is not delivered to each EPG data locator, it is assumed as providing all layers. Namely, this method is a scheme of explicitly declaring all DeliveryLayer provided by an EPG provider.

Based on this information, a receiver is able to identify an EPG provider that provides EPG metadata for a COD service. Based on this, the receiver accesses a necessary EPG provider and is then able to receive EPG metadata. Of course, this is identically applicable to information on a service different from the COD service as well.

Figure 20:
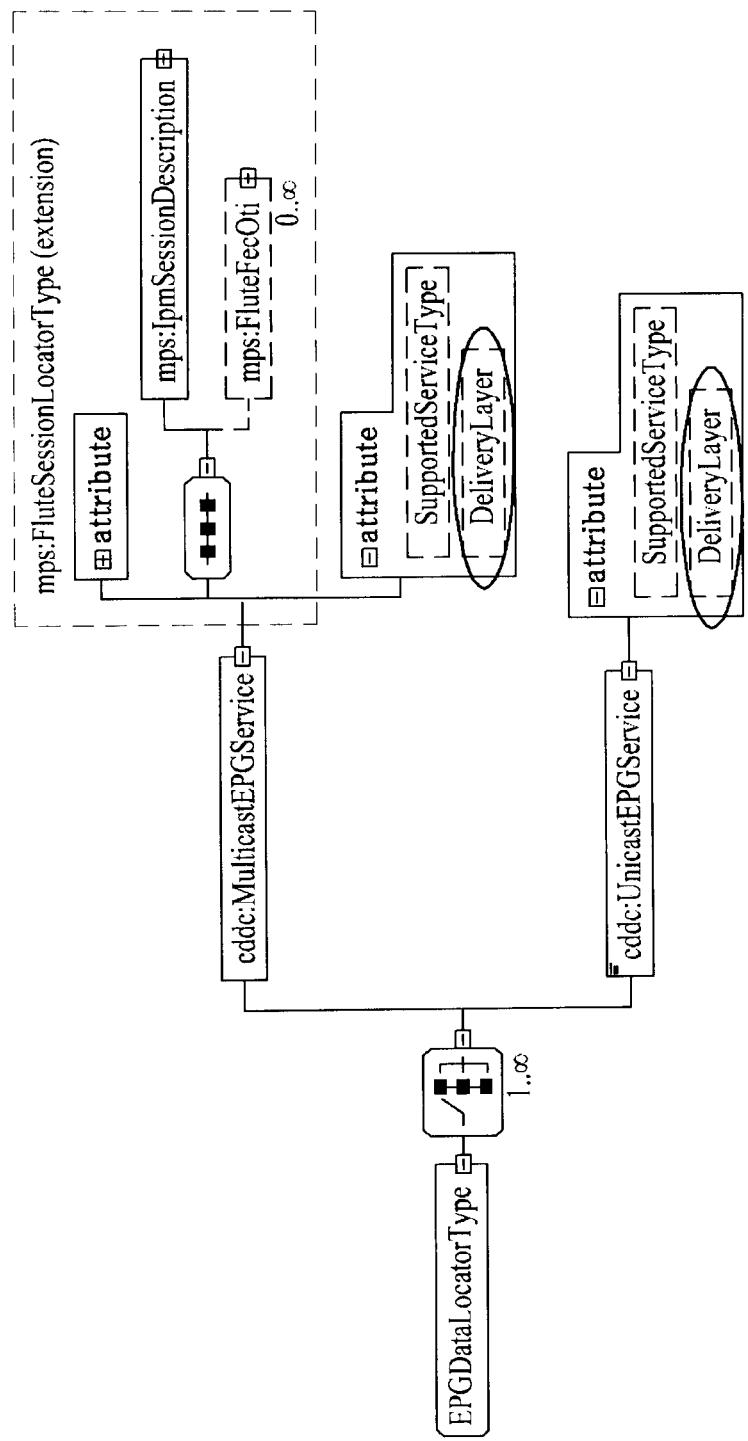

FIG. 20 and FIG. 21 are diagrams for a data structure of an EPG data locator according to one embodiment of the present invention, respectively. FIG. 22 is a diagram for a data structure of a delivery layer according to one embodiment of the present invention.

For instance, it is able to provide n locations of EPG data provided by an EPG provider using EPG provider information. In this case, EPG data type and delivery layer provided per EPG data location may be different. In order to signal this information, it is intended to extend an EPG data locator as shown in FIG. 20 and FIG. 21.

EPG metadata can be delivered by multicast or unicast using FLUTE. In case of the multicast delivery, signaling is performed via multicast EPG service. In case of the unicast delivery, signaling is performed via unicast EPG service. By adding the above described attribute 'SupporteServiceType to each element, a type of a service supported by each stream is signaled.

Meanwhile, in this closure, information according to one embodiment of the present invention is added as an element or an attribute. Optionally, the element and the attribute can be used together if necessary.

In order to signal that metadata transmitted via a corresponding EPG data locator corresponds to which layer, an attribute "DeliveryLayer" is added. This attribute can have a value of the format shown in FIG. 22 and signals a layer of EPG metadata transmitted from the corresponding EPG data locator.

Thus, a method of specifying a profile of EPG metadata delivered from a corresponding source is available as well as the method of signaling the corresponding layer in direct. If EPG metadata for a base layer defined according to one embodiment of the present invention is defined as "Lightweight EPG Metadata Profile", the same effect can be obtained by specifying this profile information.

Moreover, in case of extension to n-layer, i.e., in case of differentiating a layer configuration per service provider, indication of an accurate EPG data profile is more effective than indicating an order of a layer.

A receiver selects one of several EPG data locations in consideration of its processing capability, a type of EPG data currently needed by a user and the like and is then able to receive EPG metadata.

Based on the above information, the receiver is able to identify an EPG data location that provides EPG metadata about a COD service. Based on this, the receiver accesses a necessary EPG data location and is then able to receive EPG metadata. Of course, this is identically applicable to information on a service different from the COD service as well.

In brief, a method of processing an element 'delivery layer' added to EPG provider information or an EPG data locator according to one embodiment of the present invention is explained with reference to FIG. 5, FIG. 19, FIG. 20 and the like as follows.

A method of processing an EPG (Electronic Program Guide) metadata in a network device comprises both a step of performing a services discovery procedure utilizing multiple service discovery metadata components supplied by a service provider, and a step of processing an EPG metadata.

Figure 39:
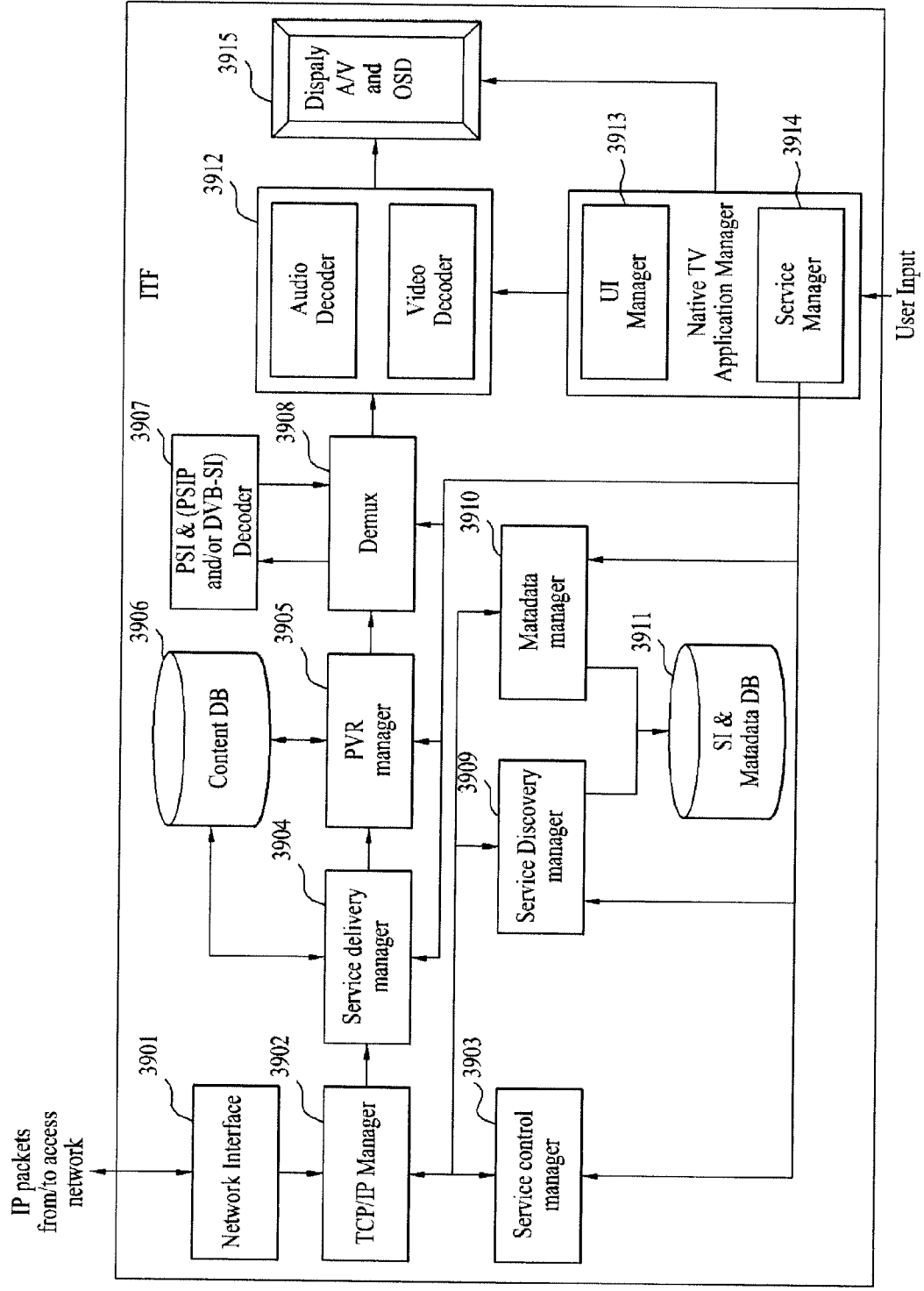
FIG. 39 is a diagram of a network device according to one embodiment of the present invention.

Meanwhile, the performing step can be designed to be handled by a service discovery manager 4109 shown in FIG. 39. And, the processing step can be designed to be handled by the metadata manager 4110 shown in FIG. 39.

And, the performing step includes four kinds of steps shown in FIG. 5.

The performing step comprises a first receiving step of receiving a master SI table which locates in a master SI table location in provisioning information. Furthermore, the provisioning information includes multiple elements. An EPG provider information element in the multiple elements has both a first delivery layer element and an EPG data locator element. The first delivery layer element gives a type of delivery layer that is delivered by at least one of an EPG metadata provider's EPG data sources.

Meanwhile, the delivery layer element included in the EPG provider information is exemplarily shown in FIG. 19.

Moreover, the performing step comprises a second receiving step of receiving a virtual channel map table which locates in virtual channel map locations in the received master SI table, a third receiving step of receiving a virtual channel description table which locates in virtual channel description table locations in the received virtual channel map table, and a fourth receiving step of receiving a source table which locates in source table locations in the received virtual channel description table.

For example, the provisioning information is obtained by the network device during a SP (service provider) attachment. Moreover, the network device may correspond to at least one of an ITF (IPTV Terminal Function) device, a mobile device and a digital television.

Moreover, as mentioned in the foregoing description, profiles for the EPG metadata are classified by 3 sorts of an EPG full profile, an EPG lite profile having less than information in the EPG full profile and an EPG list profile having less than information in the EPG lite profile.

Furthermore, fragments on each of organization name information and review information are applicable for the EPG full profile other than the EPG lite profile and the EPG list profile.

Meanwhile, according to another embodiment of the present invention, the method further includes the step of receiving fragments on either the EPG lite profile, the EPG list profile, or the EPG full profile depending on information of the delivery layer while an unicast EPG metadata delivery service as well as the performing step and the processing step.

For example, a value of the delivery layer elements corresponds to at least one of a list information, a lite information and a full information.

A delivery of the EPG metadata performs using a service guide delivery unit (SGDU) containing a collection of fragments that meet a grouping criteria, and a grouping of the fragments in the SGDU conforms to the grouping criteria declared for the SGDU in SGDDs(Service Guide Delivery Descriptors) announcing the SGDU.

For example, the grouping criteria is based on at least one of a start time, an end time, a service ID, and genre properties of schedule events. And, the fragments correspond to at least one of a program information fragment, a schedule fragment, and a review fragment.

According to the above design, it is advantageous in that a delivery layer of EPG metadata can be identified on a level of EPG provider information or a level of an EPG data locator. Moreover, it is uniquely effective to selectively receive an EPG lite profile, an EPG list profile, or an EPG full profile according to a delivery layer from the unicast EPG metadata delivery service.

Figure 23:
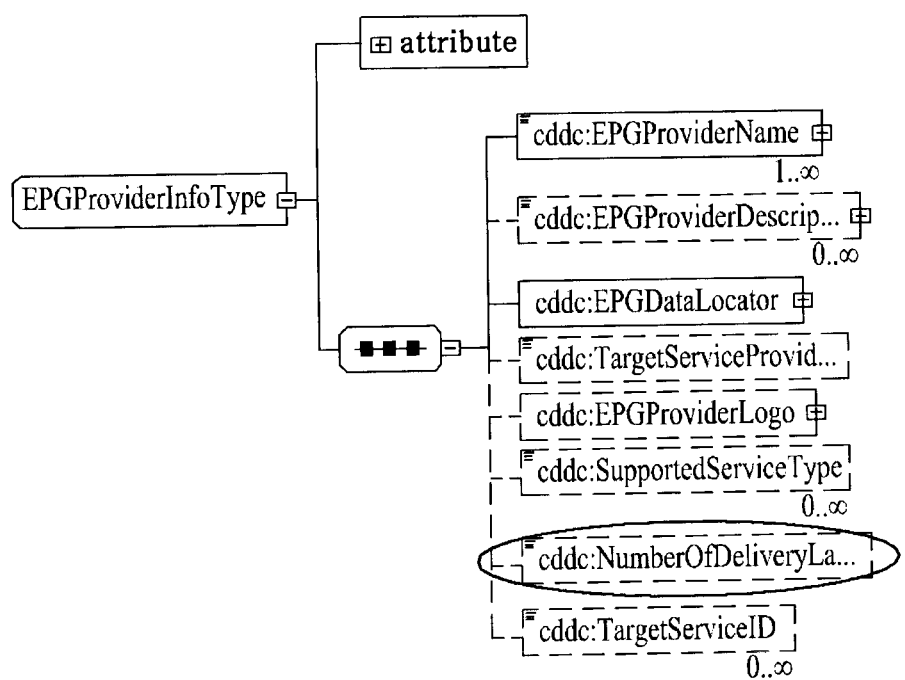
Figure 25:
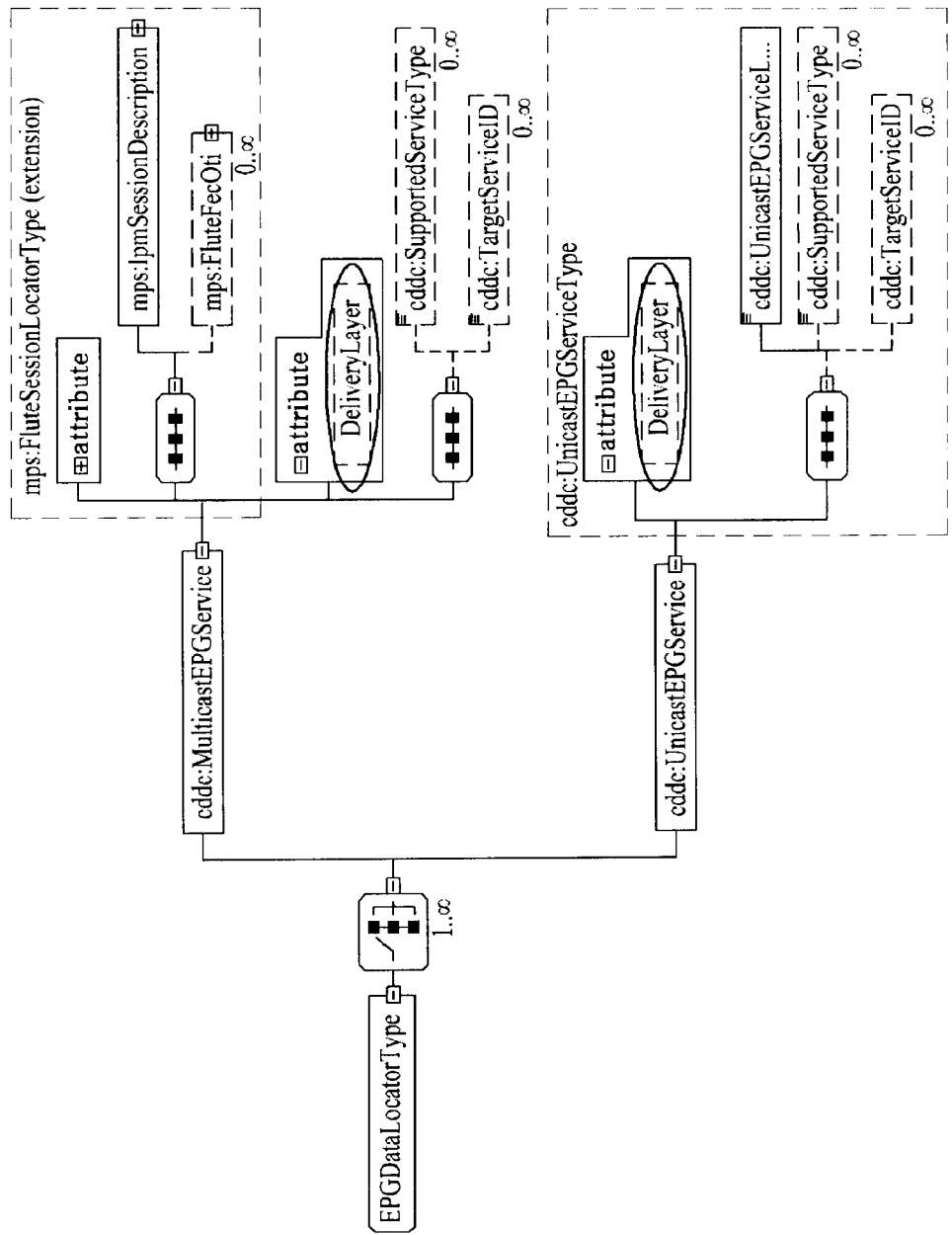

FIG. 23 and FIG. 24 are diagrams for a data structure of EPG provider information according to another embodiment of the present invention, respectively. And, FIG. 25 and FIG. 26 are diagrams for a data structure of an EPG data locator according to another embodiment of the present invention, respectively. A method of signaling an address of a COD catalog server using EPG provider information is described with reference to FIG. 23 and the like as follows.

EPG Provider information according to the present embodiment follows a scheme of including a list of target services providing EPG metadata. In particular, referring to FIG. 23 and FIG. 24, the target service list is directly enumerated in form of "TargetServiceID". Moreover, in case of attempting to selectively receive metadata about specific services subscribed by a user or specific services having authority for the service metadata access, it is able to use the corresponding EPG provider.

And, it is possible to specify a service type per each data location provided by an EPG provider. Schema of this case is shown in FIG. 25 and FIG. 26. In a manner of extending both MulticastEPGService and UnicastEPGService, at least zero or more "SupportServiceType" and "TargetServiceID" can be provided as subordinate elements. Through this, it is able to specify a type and ID of a service supported per EPG data location. Based on this, it is able to select an EPG data location to receive.

Moreover, by adding an element NumberOfDeliveryLayer, EPG metadata is enabled to be delivered via n-layer.

Figure 27:
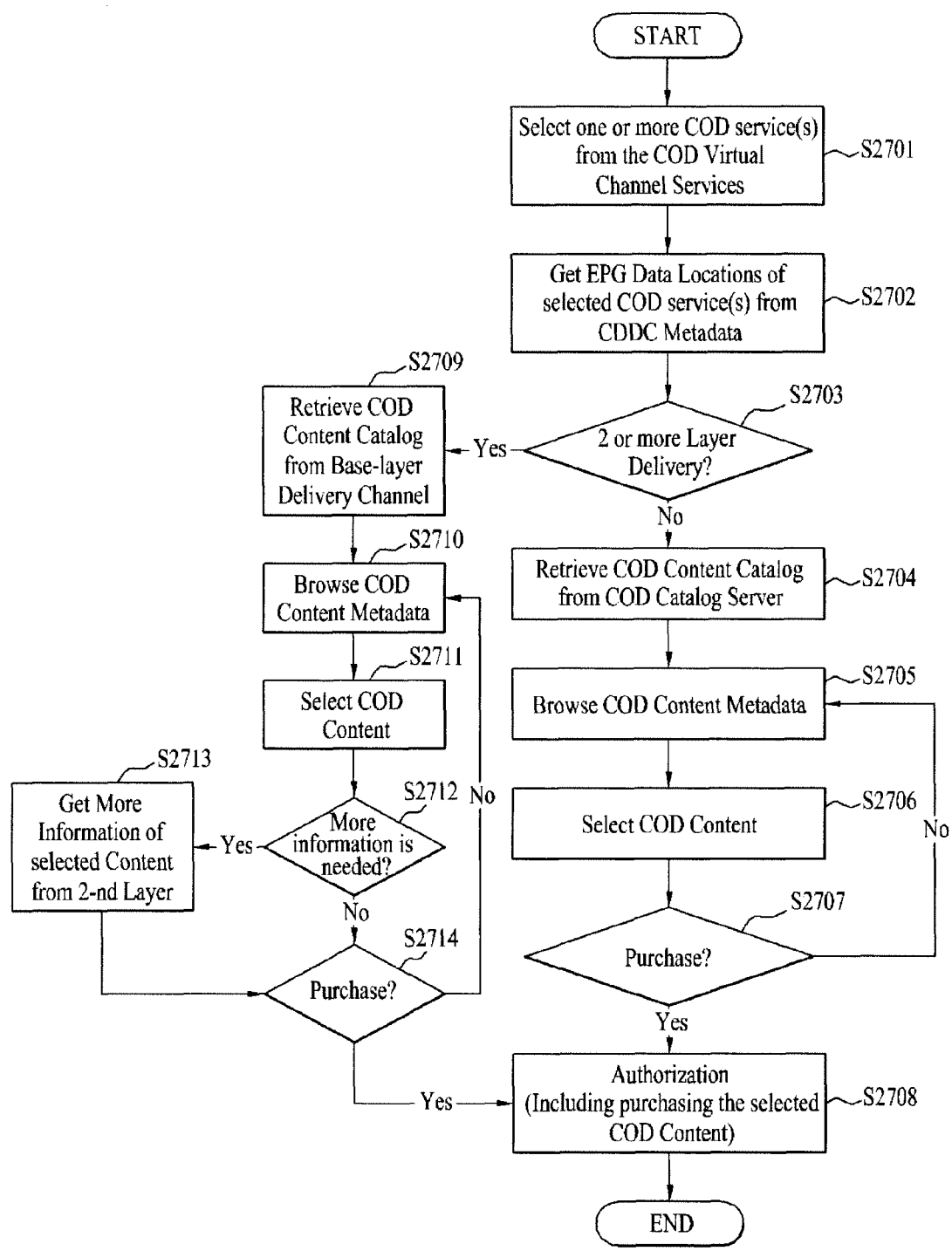
FIG. 27 is a detailed diagram of the steps S808 and S809 in FIG. 8.

FIG. 27 is a detailed diagram of the steps S808 and S809 in FIG. 8. A process for a network device according to one embodiment of the present invention to receive and process content metadata is described with reference to FIG. 27 as follows.

The network device selects one or more COD services from the COD virtual channel services(S2701). The network device gets EPG data locations of selected COD services from CDDC metadata(S2702). The network device determines whether a current delivery layer is multiple layer delivery or not(S2703). If no, the network device retrieves COD content catalog from COD catalog server(S2704). The network device browses COD content metadata(S2705). The network device selects COD content(S2706). The network device determines whether the COD content is purchased (S2707). If yes, the network device performs an authorization (S2708).

If yes(S2703), the network device retrieves COD content catalog from base-layer delivery channel(S2709). The network device browses COD content metadata(S2710). The network device selects COD content(S2711). The network device determines whether more information is needed (S2712). If yes, the network device gets more information of selected content from 2-nd layer(S2713). If no, the network device determines whether the COD content is purchased (S2714).

The above described metadata processing method is applicable as a scheme of supporting a COD service to a linear TV service. In case of a real-time broadcast service, additional consideration is needed. According to one embodiment of the present invention, proposed is a method of performing the EPG metadata delivery for the linear TV service efficiently.

According to the above mentioned service signaling mechanism, each IPTV service is signaled in a manner of belonging to a virtual channel map. In this case, the virtual channel map is a bundle of a plurality of services and can be considered a concept of package. An IPTV service provider retaining a number of real-time channels can signal the channels in a manner of configuring them into several virtual channel maps instead of a single virtual channel map according to various classification types including a service configuration type, a service area and the like.

For efficient support, a signaling mechanism according to one embodiment of the present invention is configured as a hierarchical structure starting with a master SI table. If EPG metadata for the structured services are delivered by utilizing the hierarchical structure, transmission can be more efficiently performed. For this, by utilizing the formerly proposed metadata delivery mechanism, efficient EPG metadata delivery for a linear TV service is shall be achieved as follows.

First of all, there is a method of providing EPG metadata per virtual channel map. For instance, in case of performing delivery and reception by separating EPG metadata by a unit of virtual channel map subscribed by a subscriber or a unit of receivable virtual channel map rather than a case of receiving EPG metadata for all services provided by a service provider, the following advantages can be obtained.

First of all, in aspect of a user equipment, informations on subscriber-viewable channels can be selectively received. Through this, metadata data for a subscribed channel map is preferentially received, whereby EPG can be provided more quickly. In aspect of a service provider, EPG metadata are separated in the above manner and are then delivered as several streams. Therefore, it is able to reduce a consumed bandwidth. This is attributed to the effect of reducing a total size of the overall delivered metadata in a manner of providing metadata necessary per user.

Moreover, since subscriber dispersion policy can be established by a channel map unit in dispersing a subscriber load, it is able to establish a detailed load dispersion policy. Therefore, total investment cost can be reduced as well.

Secondly, there is a method of providing EPG metadata per virtual channel. This method is to provide EPG metadata by a service unit. In particular, this method is to provide metadata of a specific real-time broadcast service if a user attempts to view a broadcast guide of the specific real-time broadcast service. This method is specifically useful in case that a user equipment has difficulty in receiving and storing overall EPG metadata information due to the shortage of a storage space. For example of this method, information on real-time broadcast services, of which guide information was requested by a user, is received from a server and is then displayed to the user.

Signaling schemes for supporting the above first and second methods shall be described in detail as follows.

Figure 28:
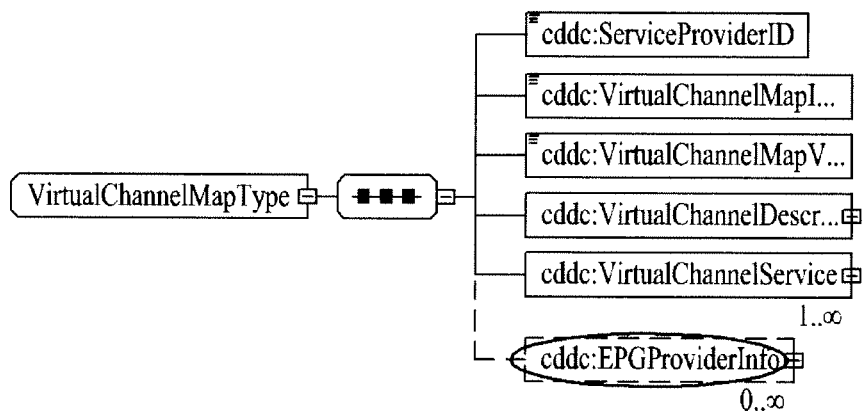
FIG. 28 is a diagram for a data structure of a virtual channel map for signaling an EPG service provider per virtual channel map according to one embodiment of the present invention.
Figure 29:
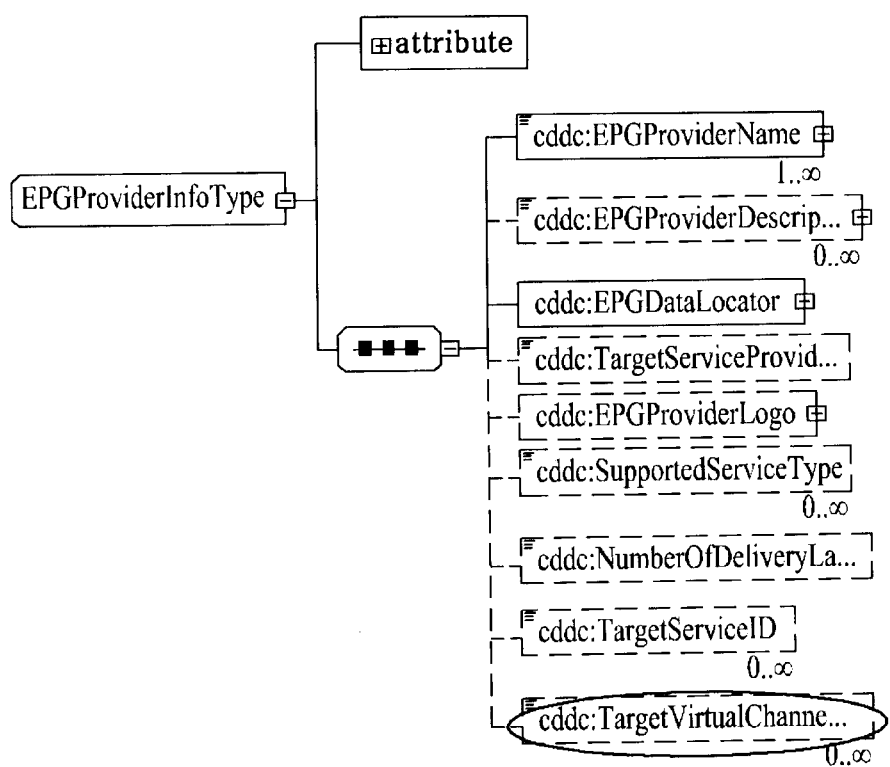
Figure 31:
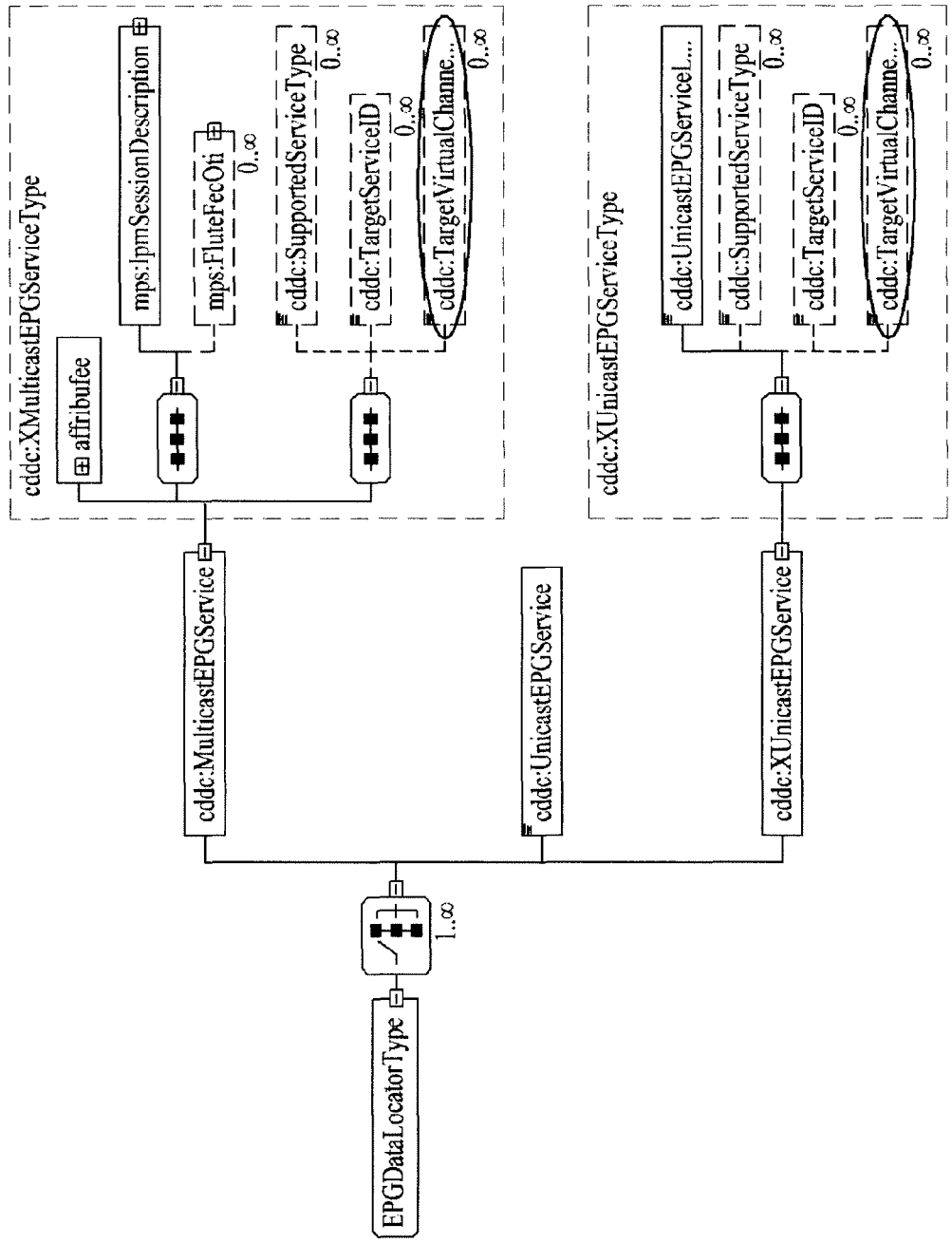

FIG. 28 is a diagram for a data structure of a virtual channel map for signaling an EPG service provider per virtual channel map according to one embodiment of the present invention. FIG. 29 and FIG. 30 are diagrams for a data structure of a virtual channel map for signaling an EPG service provider per EPG virtual channel map according to one embodiment of the present invention, respectively. And, FIG. 31 and FIG. 32 are diagrams for a data structure of an EPG data locator for signaling an EPG service provider per EPG virtual channel map according to one embodiment of the present invention, respectively.

In the following description, a method of signaling an EPG metadata provider (or an EPG data location) per virtual channel map/virtual channel is explained with reference to FIGS. 28 to 32.

First of all, there is a first method of signaling by adding EPG provider information to VirtualChannelMap Table or VirtualChannelDescription Table. Alternatively, as a modification of the first signaling method, it is able to directly specify a specific EPG data location only instead of providing all EPG provider information. In case that EPG provider information is provided via ProvisioningInfo Table, this information is redundant. Hence, it is efficient to directly provide a location of a data source only.

There is a second method of signaling VirtualChannelMap supported by extending EPG provider information signaled via Provisioning Information Table. By adding "TargetServiceID" to EPG provider information, it is able to specify a separate metadata location per service.

FIG. 28 shows an XML schema diagram of an extended VirtualChannelMap Table according to the first method. The added EPGProviderInfo element has the aforesaid EPGProviderInfo type. In this case, the signaled EPGProvider provides EPG about the VirtualChannelMap. If a multicast delivery scheme is supported, it is able to receive the EPG by joining the corresponding stream. If a unicast delivery scheme is supported, it is able to receive EPG metadata about a service belonging to the corresponding virtual channel map based on the delivery scheme described in the following.

EPGDataLocator element of EPGDataLocatorType can be included in EPG provider information, which means a case of directly specifying a location capable of receiving EPG data.

And, it is able to specify an EPG provider per service channel by adding an element of EPGProviderInfo Type to VirtualChannelDescription Table in the same manner of the above description. In this case, it is able to directly specify EPGDataLocator as well.

Two kinds of schemes of extending EPGProviderInfo according to the above described second method are possible as follows.

According to a first scheme, a use range of the formerly extended "TargetServiceID" is extended. Both Service ID and VirtualChannelMap ID correspond to IIFIDType that is a unique identifier designated as URI. Therefore, it is possible for TargetServiceID to have VirtualChannelMap ID. In this case, it is advantageous in that a new element needs not to be added.

According to a second scheme, by adding a new element "TargetVirtualChannelMapID", a supported target virtual channel map is specified. A schema diagram of extending EPG ProviderInfoType and a corresponding schema are shown in FIG. 29 and FIG. 30. Example for extension of EPGDataLocatorType is shown in FIG. 31 and FIG. 32. In the former example, UnicastEPGService is directly extended and replaced. Yet, according to the present embodiment, new XUnicastEPGService is defined. Through this, extended element and attributes are added.

Each of the first and second schemes can be located at EPGProviderInfo Level or EPG Data Locator stage. If they exist at both locations, a value located at the EPG data locator is used by replacing a located value at a higher level to specify a target service.

Figure 34:
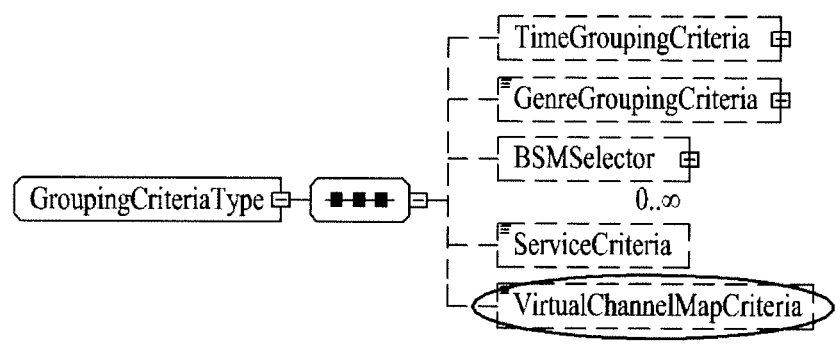

FIG. 33 is a table of fragments according to another embodiment of the present invention. And, FIG. 34 and FIG. 35 are diagram for a data structure of grouping criteria for signaling SGDD grouped per virtual channel map according to one embodiment of the present invention.

In the following description, an EPG metadata fragment configuration scheme for facilitating EPG metadata delivery per virtual channel map/virtual channel is explained with reference to FIGS. 33 to 35.

First of all, EPG metadata are delivered in a manner of being configured by a fragment unit. And, a type of the fragment is shown in FIG. 35. A unit of delivering fragments of the EPG metadata includes SGDU (service guide delivery unit) and the fragments can be delivered in a manner of being bound into a bundle of at least one fragment. Alternatively, it is able to announce the SGDU, which is the transmission unit of the EPG fragments, using SGDD (Service Guide Delivery Descriptor).

The EPG fragments announced as SGDU can be regarded as a specific view or partial set of the entire EPG metadata. Classification or characteristics of the specific view can be signaled via a groping criteria element. For example, the grouping criteria can include one of a program time, a program genre and the like.

By adding a classification of a virtual channel map unit in a manner of adding "VirtualChannelMapCriteria" element to the grouping criteria, it is intended to facilitate metadata transmission per virtual channel map. SGDUs including the EPG metadata fragments, which describe the EPG metadata corresponding to a virtual channel map matching a value of a virtual channel map ID designated to the VirtualChannelMapCriteria element, are announced by the corresponding SGDD. For this, XML schema of an extended grouping criteria type is shown in FIG. 34 and FIG. 35.

In case of describing a specific service only, a corresponding service ID can be included in previous ServiceCriteria to use. According to another embodiment, "VirtualChannelCriteria" element is newly added to use for this purpose.

According to another embodiment, instead of adding a new element, the same effect can be obtained in a manner of inserting a value of VirtualChannelMap ID or Service ID in the ServiceCriteria element.

Figure 36:
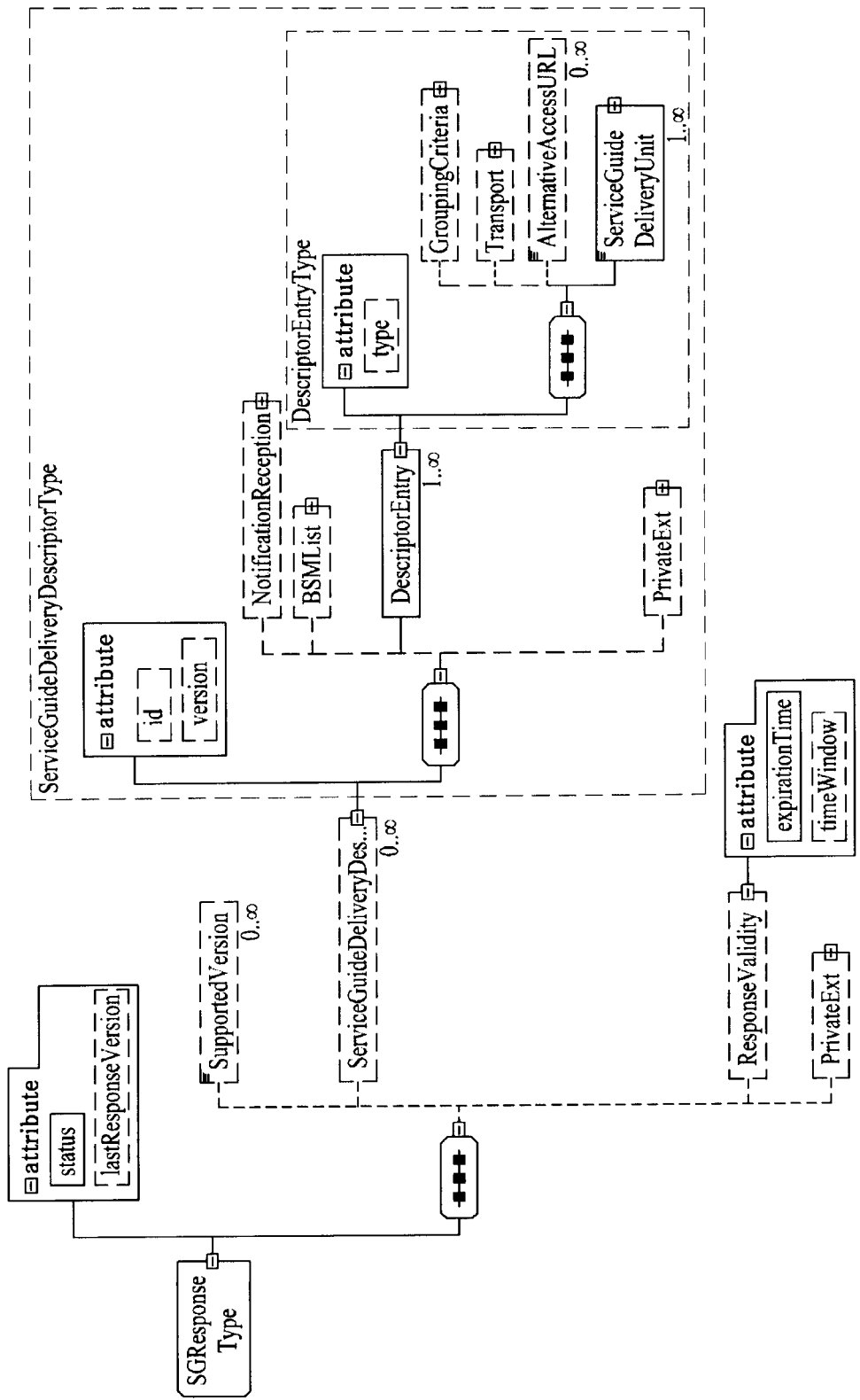
FIG. 36 is a diagram for a data structure of an SG response according to one embodiment of the present invention.
Figure 37:
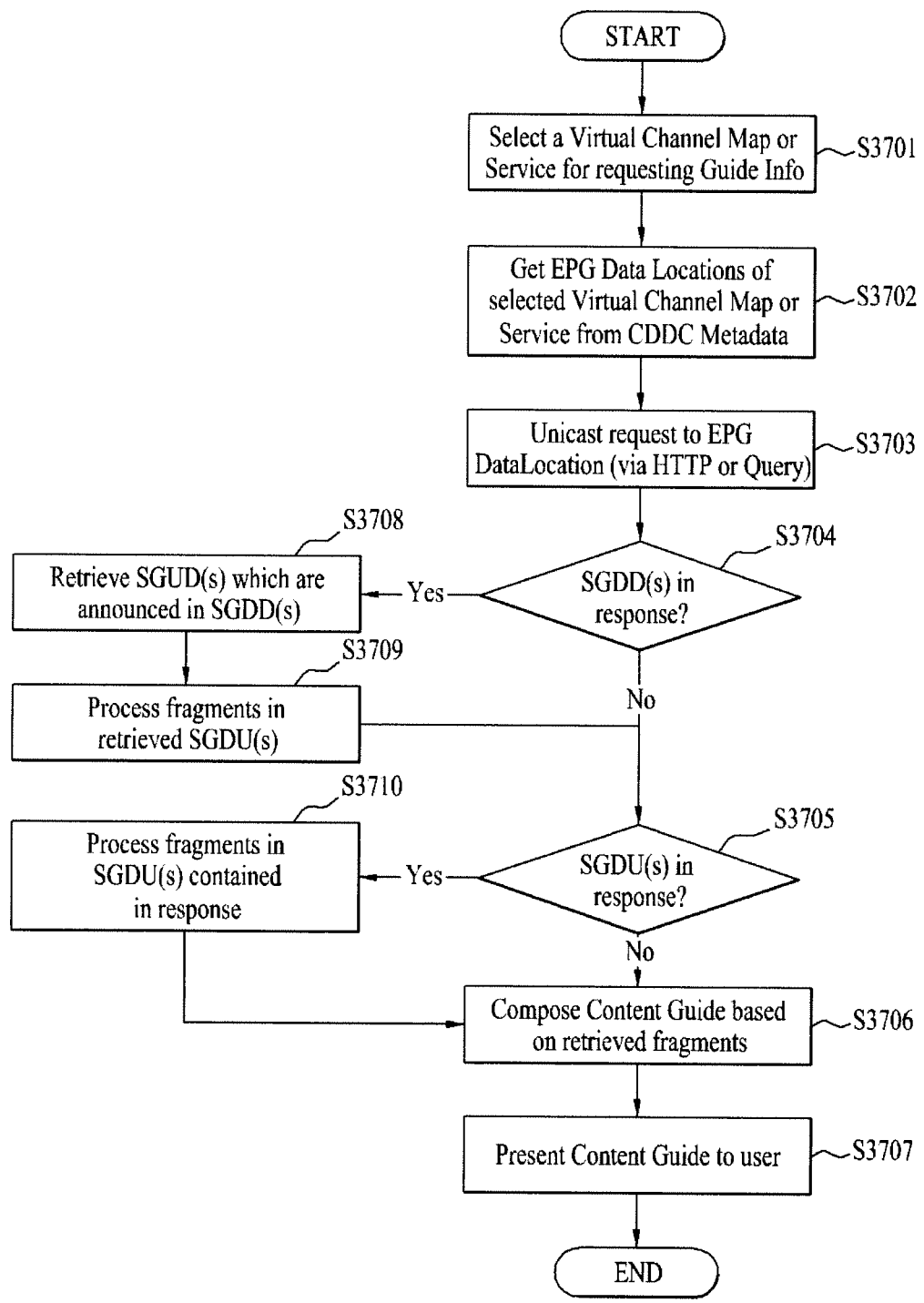
FIG. 37 is a flowchart for a method of processing content metadata for a linear TV service by unicast according to one embodiment of the present invention.

FIG. 36 is a diagram for a data structure of an SG response according to one embodiment of the present invention. And, FIG. 37 is a flowchart for a method of processing content metadata for a linear TV service by unicast according to one embodiment of the present invention. In the following description, a method o receiving EPG metadata corresponding to a virtual channel map or a specific service by unicast is explained with reference to FIG. 36 and FIG. 37.

First of all, EPG metadata delivery by unicast can be performed based on HTTP protocol for example. HTTP based request/response can match query request/response. Yet, a scheme proposed by one embodiment of the present invention is non-limited by the HTTP protocol and can be alternatively available via such a protocol as SOAP and the like. In the following description, the representation of a query request can be regarded as an HTTP request. According to one embodiment of the present invention, HTTP based Unicast EPG Metadata delivery can be represented as a query request/response based on an HTTP post method in the following.

The Query request is available via 'POST' method of HTTP/1.1. In this case, parameters included in the query request are configured with key-value pairs and are delivered according to a convention using HTML form data via the 'POST' method. Theses parameters are delivered to a server in a manner of being included in 'message-body' region of HTTP/1.1 'Request' message.

A plurality of key-value pairs can be included in one query request. In this case, each key-value pair is identified using '&'.

A response made by the server in response to the query request can include at least one "SGResponse" element having the schema shown in FIG. 36.

In case of making a request for a search result of a specific item of EPG metadata, the corresponding query request can be configured according to the following matters.

The 'message-body' of HTTP/1.1 request message SHALL contain key-value pairs, using <key> as the key representing the criteria and the <value> as the value from the domain of the criteria. These key-value pairs SHALL be delimited by a '&'. If several key-value pairs are given, they are combined as follows:

If there are several key-value pairs having the key "serviceType", these are combined using AND logic, i.e. the expected reply are Service Guide fragments that satisfy all given criteria.

If there are several key-value pairs having the key "genre", these are combined using AND logic, i.e. The expected reply are Service Guide fragments that satisfy all given criteria.

Otherwise, key-value pairs having the same key are combined using OR logic, i.e. the expected reply are Service Guide fragments that satisfy at least one of the given criteria. The group of OR-combined keys is in the next step below treated as one entity.

Key-value pairs (or groups of pairs having the same key) having different keys are combined using AND logic, i.e. the expected reply are Service Guide fragments that satisfy all given criteria.

The response to a terminal request containing key-value pairs specifying the set of fragments the terminal expects to receive SHOULD contain all the fragments matching the given criteria and MAY include in addition fragments that do not match the given criteria. If the terminal request does not contain any key-value pairs having the keys "validFrom" or "validTo", then the response SHALL contain only fragments that are currently valid.

A scheme of evaluation of match or mismatch of the above proposed key-value pair is non-limited by one embodiment. Alternatively, an evaluation scheme of a different type can be supported.

In order to receive Linear TV EPG metadata by making a request by Virtual Channel Map or service unit, it is able to additionally define the following key-value pairs to use.

<key>: "targetVCMID"
<value>: Identifier of Virtual Channel Map

In case of the above design, requested is the metadata to provide EPG of all services included in a virtual channel map of which ID matches a value of <value>.

<key>: "targetServiceID"
<value>: Identifier of Virtual Channel (Service)

In case of the above design, requested is the metadata to provide EPG of a virtual channel (service) of which ID matches a value of <value>.

<key>: "startTime"
<value>: Start time of information such as schedule, schedule event, broadcast event and the like In case of the above design, it means a start time of schedule information of a real-time broadcast of which EPG metadata is requested. The guide information starting with a time designated to <value> is requested.

<key>: "endTime"
<value>: End time of information such as schedule, schedule event, broadcast event and the like In case of the above design, it means an end time of schedule information of a real-time broadcast of which EPG metadata is requested. The guide information up to a time designated to <value> is requested.

If "startTime" and "endTime" are designated, schedule information within the time interval is requested. If one of "startTime" and "endTime" is omitted, one end can be regarded as a limited time interval. And, whether to send data amounting to prescribed days can be determined and sent by a service provider.

The above described query mechanism can be utilized in case that a separate unicast EPG data location is not specified by a virtual channel map or service unit.

According to another unicast delivery scheme, in URL designated to a unicast location for a specific virtual channel map or service, when metadata corresponding to the designated range is provided, in case that all metadata are requested as a unicast request, the metadata corresponding to the designated range is received only. In this case, the relevant virtual channel map ID or the service ID is not designated to the key-value pair but a time interval of a guide to receive is designated only.

As a result of this query, SGDD or SGDU can be received. In case of receiving the SGDD, the SGDU announced within the SGDD shall be received and processed. Moreover, a grouping criteria of the SGDD can be configured as proposed in the above fragment configuration scheme.

FIG. 37 shows an operational flow for receiving and processing content metadata for a linear TV service by unicast according to one embodiment of the present invention.

Metadata for a linear TV content is received in a manner of making a request to EPG DataLocation server using the above mentioned HTTP/Query scheme. The flowchart shown in FIG. 37 describes the processing schemes for those cases.

A server response to the HTTP/Query request can use SGDD (service guide delivery descriptor) capable of SGDU (service guide delivery unit) or SGDUs by a unit of delivering fragments of EPG metadata.

In case that the SGDD is included in the response, SGDUs announced through the response are received and processed and the SGDUs included in the response are also processed. According to this processing, all the fragments of the RPG metadata corresponding to the HTTP/Query result are received. A content guide is configured using the received fragments and are then displayed to a user.

The network device selects a virtual channel map or service for requesting guide information(S3701). The network device gets EPG data locations of selected virtual channel map or service from CDDC metadata(S3702). The network device unicast-requests to EPG data location (via HTTP or Query)(S3703).

The network device determines whether there are SGDDs in response(S3704). If no(S3704), the network device determines whether there are SGDUs in response(S3705). If no(S3705), the network device composes content guide based on retrieved fragments(S3706). The network device presents content guide to user(S3707).

If yes(S3704), the network device retrieves SGDUs which are announced in SGDDs(S3708). The network device processes fragments in retrieved SGDUs(S3709). And, the network device processes fragments in SGDUs contained in response(S3710).

Figure 38:
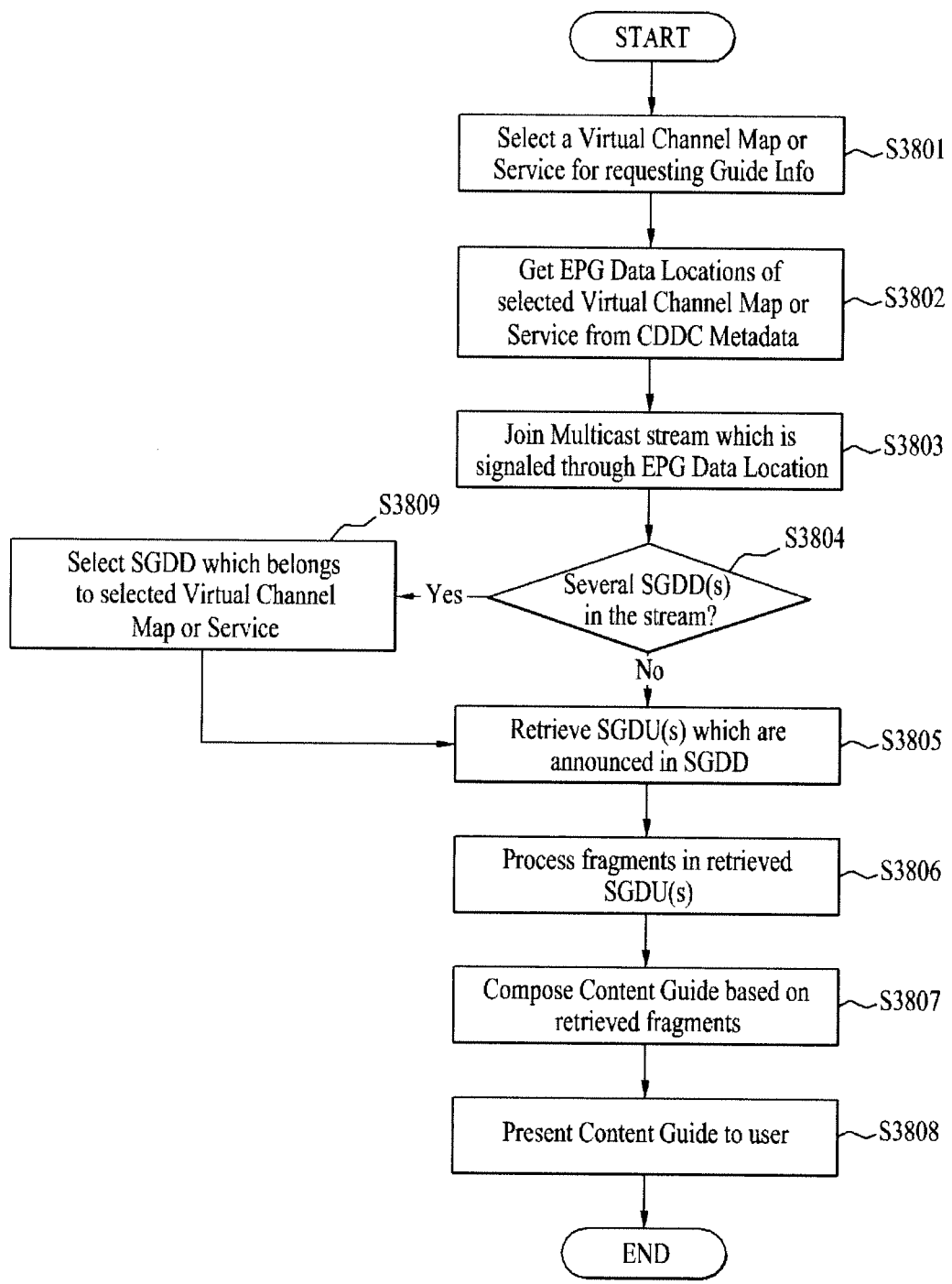
FIG. 38 is a flowchart for a method of processing content metadata for a linear TV service by multicast according to one embodiment of the present invention.

FIG. 38 is a flowchart for a method of processing content metadata for a linear TV service by multicast according to one embodiment of the present invention.

A method of receiving EPG metadata corresponding to a virtual channel map or a specific service by multicast is explained with reference to FIG. 38 as follows.

Unlike the aforesaid unicast scheme, if a delivery is performed by multicast, EPG metadata corresponding to a virtual channel map or a specific service designated to a corresponding stream are configured and delivered. In doing so, metadata of one virtual channel map or one service can be included in one multicast stream only. Alternatively, metadata of at least two virtual channel maps or at least two services can be included in one multicast stream. Thus, in case that metadata of at least two virtual channel maps or at least two services are transmitted by being included in one multicast stream, a view of metadata belonging to an SGDD, for which grouping criteria is set per metadata belonging to a specific virtual map or a specific service using the above described EPG metadata fragment configuration, can be identified with ease and an SGDU belonging to the view can be selectively received.

Moreover, FIG. 38 shows an operational flow for receiving and processing content metadata for a linear TV by multicast.

First of all, metadata for a linear TV content is received in a manner of joining a multicast stream designated to an EPG DataLocation using the aforesaid multicast scheme. The flowchart shown in FIG. 38 describes a processing scheme for this case.

If the joined multicast stream includes metadata corresponding to a specific virtual channel map or service to receive only, it is announced through one SGDD within the stream. In this case, an SGDU is obtained using the unique SGDD. A guide picture can be then configured by receiving necessary EPG metadata fragments through the obtained SGDU.

In case that metadata corresponding to at least two virtual channel maps or services are transmitted by being included in the corresponding stream, an SGDU belonging to one SGDD per virtual channel map or service is announced via the corresponding SGDD. Hence, when several SGDDs exist, whether metadata for a specific virtual channel map or service is included can be indicated by the above mentioned grouping criteria. Through this, SGDD is selected. And, an essentially necessary SGDU is selectively received. A guide picture can be then configured. Finally, the above configured content guide is displayed to a user.

The network device selects a virtual channel map or service for requesting guide information(S3801). The network device gets EPG data locations of selected virtual channel map or service from CDDC metadata(S3802). The network device joins multicast stream which is signaled through EPG data location(S3803).

The network device determines whether there are several SGDDs in the stream(S3804). If no(S3804), the network device retrieves SGDUs which are announced in SGDDs (S3805). The network device processes fragments in retrieved SGDUs(S3806). The network device composes content guide based on retrieved fragments(S3807). The network device presents content guide to a user(S3808).

If yes(S3804), the network device selects SGDD which belongs to selected Virtual Channel Map or service(S3809).

FIG. 39 is a diagram of a network device according to one embodiment of the present invention. In the following description, a network device according to one embodiment of the present invention is described with reference to FIG. 39.

A Network Interface(3901) performs receiving/sending IPTV packets. The network interface(3901) may correspond to physical & data link layers.

An TCP/IP Manager(3902) is responsible for end to end (source to destination) packet delivery. The TCP/IP manager (3902) classifies each packets into appropriate protocol manager.

A Service Delivery Manager(3904) is responsible for handling real-time streaming data and downloading content. The service delivery manager(3904) is also responsible for retrieving contents from Content DB for later consuming. RTP/RTCP (Real-Time Transport Protocol/RTP Control Protocol) may be used with MPEG-2 TS. MPEG-2 packets are encapsulated in RTP. The service delivery manager(3904) parses RTP packets and sends the parsed transport packets to DEMUX. The service delivery manager(3904) sends feedback on the network reception quality using RTCP. MPEG-2 transport packets may be carried directly in UDP without RTP. For content downloading, HTTP or FLUTE protocol may be used for delivery protocol.

A demultiplexer(3908) performs de-multiplexing audio, video and PSI tables from input transport packets. The demux (3908) controls the de-multiplexing for PSI tables by PSI Decoder. The demux(3908) performs making the sections of PSI tables and sending them to PSI Decoder. The demux (3908) controls the de-multiplexing for A/V transport packets.

A PSI & (PSIP and/or DVB-SI) Decoder(3907) may correspond to PSI(and PSIP/DVB-SI) Control Module. The PSI & (PSIP and/or DVB-SI) Decoder(3907) sets PIDs for PSI tables and PSIP/DVB-SI tables to DEMUX. The PSI & (PSIP and/or DVB-SI) Decoder(3907) performs decoding the private sections of PSI and (PSIP and/or DVB-SI) sent by DEMUX. The decoding result is used to de-multiplex input transport packets. (e.g. set Audio and Video PID to DEMUX.)

A Audio and Video Decoder (3912) performs decoding audio and video elementary stream packets.

A A/V and OSD Displayer(3915) receives audio and video data from A/V Decoder. The A/V and OSD Displayer(3915) controls video and audio data and displays them on the Screen and speaker. The A/V and OSD Displayer(3915) controls OSD (On Screen Display) Graphic data.

A Native Application manager and UI (User Interface) Manager(3913) performs supporting the Graphic User Interface on TV Screen, receiving user key by remote control or front panel, and managing the states of the whole TV system.

A Service Manager(3914) controls all the other managers related to the services like Service control manager, Service delivery manager, IG-OITF client, Service Discovery manager, and Metadata manager. The service manager(3914) is responsible for serving IPTV services.

A SI & Metadata DB(3911) is a database for Service Discovery information and Metadata related to the services.

A SD(Service Discovery) Manager(3909) performs enabling of the discovery of IPTV services over bi-directional IP network. The SD manager(3909) provides all the information for selecting service.

A Service Control Manager(3903) is responsible for selecting and controlling services and managing sessions. The service control manager(3903) selects live broadcasting service, using IGMP or RTSP protocol. The service control manager(3903) selects VOD contents, using RTSP protocol. If using IMS, SIP protocol is used for initiating and managing sessions through IMS Gateway. RTSP protocol can be used in controlling of the delivery of broadcast TV and audio as well as for on-demand delivery. RTSP protocol uses a persistent TCP connection and allows trick mode control on real-time media streaming.

A Content DB(3906) is a database for Contents which may be delivered by content download system or may be recorded from live media TV.

A PVR manager(3905) is responsible for recording and playing live streaming contents. The PVR manager(3905) performs gathering all the necessary metadata of the recorded content and generating additional information for better user experience (e.g. thumbnail image, index etc). Furthermore, a metadata manager(3910) controls metadata on EPG.

Figure 40:
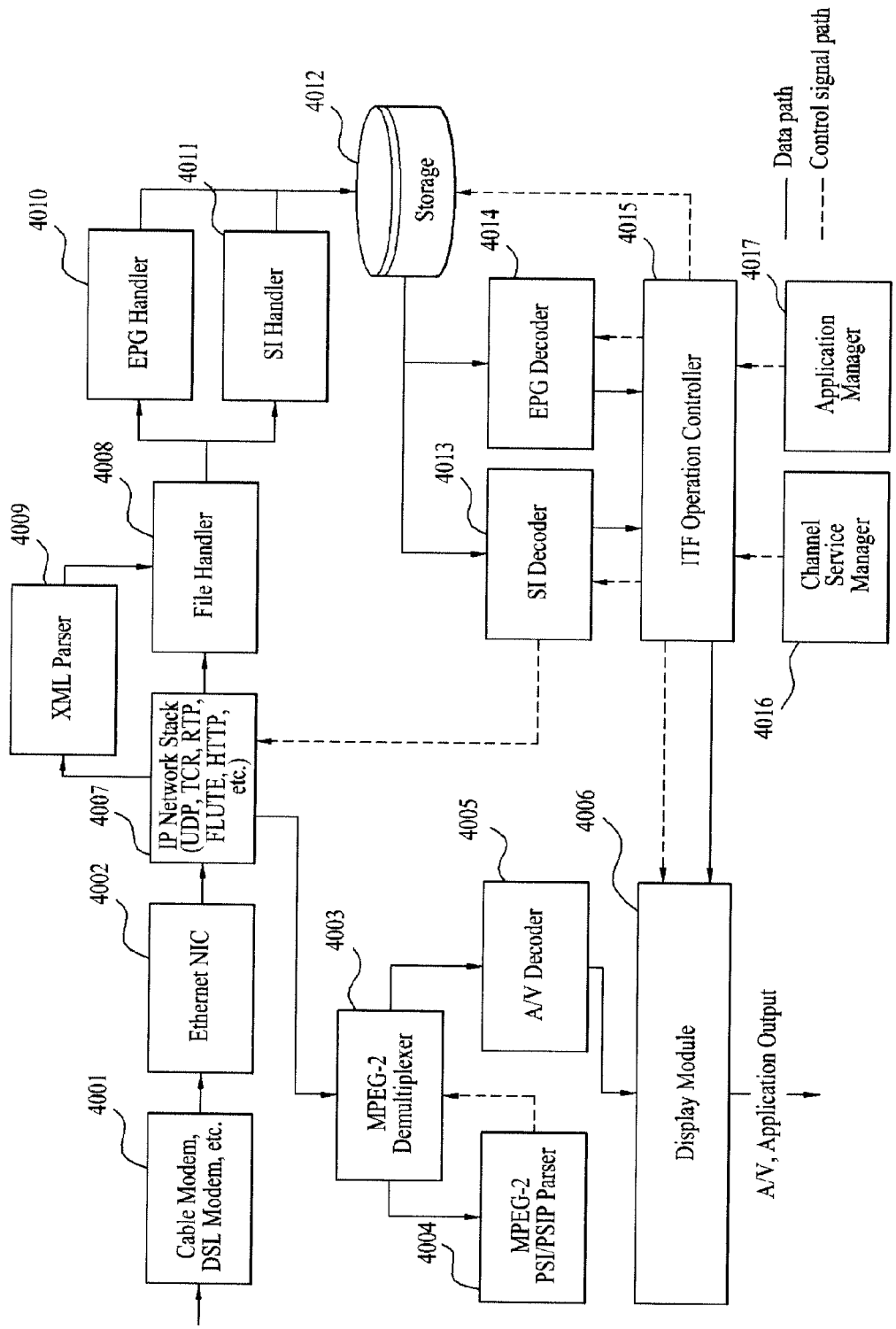
FIG. 40 is a diagram of a network device according to another embodiment of the present invention.

FIG. 40 is a diagram of a network device according to another embodiment of the present invention. In the following description, a network device according to another e embodiment of the present invention is described with reference to FIG. 40.

In particular, FIG. 40 is a functional block diagram of each module of a network device (e.g., IPTV terminal function: ITF). In FIG. 40, a bold arrow indicates a data path, while a doted arrow indicates a control signal path.

A Cable modem, DSL modem and etc. 4001 reconstruct a digital signal by demodulating a signal transmitted via an interface and physical medium via which an ITF is connected to an IP network on a physical level.

An Ethernet NIC 4002 is a module configured to reconstruct IP data from the signal received via the physical interface.

An IP Network Stack 4007 is a processing module of each layer according to an IP protocol stack.

An XML Parser 4009 is a module configured to parse XML document in the received IP data.

A File Handler 4008 is a module configured to process data transmitted as a file in the received IP data.

An SI Handler 4011 is a module configured to process a portion corresponding to IPTV SI data in the received file type data and enable the processed portion to be stored in a storage.

An EPG Handler 4010 is a module configured to process a portion corresponding to the file type IPTV EPG data and enable the processed portion to be stored in the storage.

A Storage 4012 is a storage space configured to store such data necessary to be stored as SI, EPG and the like.

An SI Decoder 4013 is a module configured to reconstruct necessary data. In case that channel map information is necessary, the SI decoder 4213 brings the SI data from the storage, analyzes the SI data, and then reconstructs necessary information.

An EPG Decoder 4014 is a module configured to reconstruct necessary data. In case that EPG information is necessary, the EPG decoder 4014 brings the EPG data from the storage, analyzes the EPG data, and then reconstructs necessary information.

An ITF Operation Controller 4015 is a main controller configured to control such an operation of ITF as a channel switching, an EPG display and the like.

A Channel Service Manager 4016 is a module configured to manage a channel switching operation by receiving an input from a user.

An Application Manager 4017 is a module configured to manage such an application service as an EPG display and the like by receiving an input from a user.

An MPEG-2 Demultiplexer 4003 is a module configured to extract MPEG-2 transport stream data from the received IP datagram and deliver the extracted data to a corresponding module according to each PID.

An MPEG-2 PSI/PSIP Parser 4004 is a module configured to extract and parse PSI/PSIP data containing such information for accessing a program element as PID information of each data (e.g., A/V data, etc.) of the MPEG-2 transport stream within the received IP datagram.

An A/V Decoder 4005 is a module configured to decode the delivered A/V data and deliver the decoded data to the display module 4006.

Meanwhile, a method according to the present invention is recordable in a computer readable medium in a manner of being implemented into a program command type executable through various computer means. The computer readable medium can include a program command, a data file, a data structure or combinations thereof. The program command recorded in the medium is specially designed and configured for the present invention or can be known in public to those skilled in the field of software. For example, the computer readable recording medium includes a magnetic medium such as a hard disk, a floppy disk and a magnetic tape, an optical medium such as a CD-ROM and a DVD, a magneto-optical medium such as a floptical disk, or such a hardware device specially configured to store and execute a program command as a ROM, a RAM, a flash memory and the like. For example, the program command includes a machine code created by compiler or a high-level language code executable by a computer using an interpreter and the like. The hardware device can be configured to operate as at least one software module to perform an operation of the present invention, and vice versa.

As mentioned in the foregoing description, the relevant matters are described in the best mode of the present invention.

Regarding industrial applicability, the present invention is applicable to a digital broadcasting system entirely or in part.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing an EPG (Electronic Program Guide) metadata in a network device, the method comprising:
performing a services discovery procedure utilizing multiple service discovery metadata components supplied by a service provider, wherein the step of performing comprises multiple steps of:
receiving provisioning information, wherein the provisioning information includes multiple elements, an EPG provider information element in the multiple elements having both a first delivery layer element and an EPG data locator element, the first delivery layer element giving a type of delivery layer that is delivered by at least one of an EPG metadata provider's multicast EPG data sources, wherein the EPG data locator element includes a second delivery layer element which gives a type of delivery layer that is delivered b an EPG data source corresponding to the data locator element,
receiving a master SI table which locates in a master SI table location in the provisioning information,
receiving a virtual channel map table which locates in a virtual channel map location in the received master SI table,
receiving a virtual channel description table which locates in a virtual channel description table location in the received virtual channel map table, and receiving a source table which locates in a source table location in the received virtual channel description table; and processing an EPG metadata, wherein profiles for the EPG metadata are classified by 3 sorts of an EPG full profile, an EPG lite profile having less than information in the EPG full profile and an EPG list profile having less than information in the EPG lite profile, wherein the type of delivery layer represents a quantity of the EPG metadata, wherein the type of delivery layer represents one of three types, the three types including a full layer for delivering full EPG metadata of the EPG full profile, a lite layer for delivering lite EPG metadata of the EPG lite profile, and a list layer for delivering list EPG metadata of the EPG list profile, wherein the EPG Lite profile is obtained from the full profile at least by eliminating some of classification schemes; and wherein fragments in an SGDU (Service Guide Delivery Unit) belong to the same profile, and wherein SGDUs described in the SGDD (Service Guide Delivery Desciptor) contain fragments of the same profile.

2. The method of claim 1, wherein fragments on each of organization name information and review information are applicable for the EPG full profile other than the EPG lite profile and the EPG list profile.

3. The method of claim 1, wherein the step of processing further includes a step of receiving fragments on either the EPG lite profile, the EPG list profile, or the EPG full profile depending on information of the delivery layer while an unicast EPG metadata delivery service.

4. The method of claim 1, wherein the provisioning information is obtained by the network device during a SP (service provider) attachment.

5. The method of claim 1, wherein the network device corresponds to at least one of an ITF (IPTV Terminal Function) device, a mobile device and a digital television.

6. The method of claim 1, wherein a delivery of the EPG metadata performs using a service guide delivery unit (SGDU) containing a collection of fragments that meet a grouping criteria, and a grouping of the fragments in the SGDU conforms to the grouping criteria declared for the SGDU in SGDDs(Service Guide Delivery Descriptors) announcing the SGDU.

7. The method of claim 6, wherein the grouping criteria is based on at least one of a start time, an end time, a service ID, and genre properties of schedule events.

8. The method of claim 6, wherein the fragments correspond to at least one of a program information fragment, a schedule fragment, and a review fragment.

9. A network device for processing an EPG (Electronic Program Guide) metadata, the network device comprising:

a service discovery manager configured to perform a services discovery procedure utilizing multiple service discovery metadata components supplied by a service provider, wherein the service discovery manager further configured to:

receive provisioning information, wherein the provisioning information includes multiple elements, an EPG provider information element in the multiple elements having both a first delivery layer element and an EPG data locator element, the first delivery layer element giving a type of delivery layer that is delivered by at least one of an EPG metadata provider's multicast EPG data sources, wherein the EPG data locator element includes a second delivery layer element which gives a type of delivery layer that is delivered by an EPG data source corresponding to the EPG data locator element, receive a master SI table which locates in a master SI table location in the provisioning information, receive a virtual channel map table which locates in a virtual channel map location in the received master SI table, receive a virtual channel description table which locates in a virtual channel description table in the received virtual channel map table, and receive a source table which locates in a source table location in the received virtual channel description table; and a controller configured to process an EPG metadata, wherein profiles for the EPG metadata are classified by 3 sorts of an EPG full profile, an EPG lite profile having less than information in the EPG full profile and an EPG list profile having less than information in the EPG lite profile, wherein the type of delivery layer represents a quantity of the EPG metadata, wherein the type of delivery layer represents one of three types, the three types including a full layer for delivering full EPG metadata of the EPG full profile, a lite layer for delivering lite EPG metadata of the EPG lite profile, and a list layer for delivering list EPG metadata of the EPG list profile, wherein the EPG Lite profile is obtained from the full profile at least by eliminating some of classification schemes; and wherein fragments in an SGDU (Service Guide Delivery Unit) belong to the same profile, and wherein SGDUs described in the SGDD (Service Guide Delivery Descriptor) contains fragments if the same profile.

10. The network device of claim 9, wherein fragments on each of organization name information and review information are applicable for the EPG full profile other than the EPG lite profile and the EPG list profile.

11. The network device of claim 9, wherein the controller further receives fragments on either the EPG lite profile, the EPG list profile, or the EPG full profile depending on information of the delivery layer while an unicast EPG metadata delivery service.

12. The network device of claim 9, wherein the provisioning information is obtained by the network device during a SP (service provider) attachment.

13. The network device of claim 9, wherein the network device corresponds to at least one of an ITF (IPTV Terminal Function) device, a mobile device and a digital television.

14. The network device of claim 9, wherein a delivery of the EPG metadata performs using a service guide delivery unit (SGDU) containing a collection of fragments that meet a grouping criteria, and a grouping of the fragments in the SGDU conforms to the grouping criteria declared for the SGDU in SGDDs(Service Guide Delivery Descriptors) announcing the SGDU.

15. The network device of claim 14, wherein the grouping criteria is based on at least one of a start time, an end time, a service ID, and genre properties of schedule events.

16. The method of claim 14, wherein the fragments correspond to at least one of a program information fragment, a schedule fragment, and a review fragment.

* * * * *